United States Patent
Tajima et al.

(10) Patent No.: US 11,708,538 B2
(45) Date of Patent: Jul. 25, 2023

(54) EMULSIFICATION DISPERSANTS, A METHOD FOR EMULSIFICATION AND DISPERSION USING THE EMULSIFICATION DISPERSANTS, EMULSIONS, AND EMULSION FUELS

(71) Applicant: KANAGAWA UNIVERSITY, Kanagawa (JP)

(72) Inventors: Kazuo Tajima, Kanagawa (JP); Yoko Imai, Tokyo (JP); Teruo Horiuchi, Saitama (JP)

(73) Assignee: KANAGAWA UNIVERSITY, Kanagawa (JP)

( * ) Notice: Subject to any disclaimer, the term of this patent is extended or adjusted under 35 U.S.C. 154(b) by 1160 days.

(21) Appl. No.: 15/360,183

(22) Filed: Nov. 23, 2016

(65) Prior Publication Data
US 2017/0073596 A1  Mar. 16, 2017

Related U.S. Application Data

(62) Division of application No. 11/547,625, filed as application No. PCT/JP2005/005795 on Mar. 29, 2005, now Pat. No. 9,506,001.

(30) Foreign Application Priority Data

Apr. 5, 2004 (JP) .................................. 2004-110915
Sep. 1, 2004 (JP) .................................. 2004-254384
(Continued)

(51) Int. Cl.
*C10L 1/32* (2006.01)
*C10L 1/198* (2006.01)
(Continued)

(52) U.S. Cl.
CPC .............. *C10L 1/328* (2013.01); *C09K 23/00* (2022.01); *C09K 23/017* (2022.01); *C09K 23/14* (2022.01);
(Continued)

(58) Field of Classification Search
CPC .. B01F 3/00; B01F 17/00; C10L 1/326; C10L 2250/04; C10L 2250/06
See application file for complete search history.

(56) References Cited

U.S. PATENT DOCUMENTS 4,241,191 A   12/1980  Keppler et al.
4,670,185 A    6/1987  Fujiwara et al.
(Continued)

FOREIGN PATENT DOCUMENTS

FR    2 485 921 A1    1/1982
JP    S49-008503 A    1/1974
(Continued)

OTHER PUBLICATIONS

International Search Report.
(Continued)

*Primary Examiner* — Ellen M McAvoy
*Assistant Examiner* — Ming Cheung Po
(74) *Attorney, Agent, or Firm* — Michael Best & Friedrich LLP

(57) ABSTRACT

An emulsifying dispersant includes, as the main component, vesicles formed from an amphiphilic substance capable of self-assembly or an emulsifying dispersant comprising single particles of a biopolymer as the main component. The particles made from amphiphilic substances capable of self-assembly are used. The amphiphilic substances are selected from among polyoxyethylene-hydrogenated castor oil derivatives wherein the average number of added ethylene oxide molecule is 5 to 15, dialkyldimethyl-ammonium
(Continued)

halides wherein the chain length of the alkyl or alkenyl is 8 to 22, and phospholipids or phospholipid derivatives. According to the invention a three-phase structure composed of an aqueous phase, an emulsifying dispersant phase and an oil phase is formed on the surface of an emulsion to give an emulsion (such as emulsion fuel) excellent in thermal stability and long-term stability.

18 Claims, 12 Drawing Sheets

(30) Foreign Application Priority Data

| Sep. 3, 2004 | (JP) | 2004-257363 |
|---|---|---|
| Nov. 11, 2004 | (JP) | 2004-327915 |
| Feb. 1, 2005 | (JP) | 2005-024792 |
| Feb. 1, 2005 | (JP) | 2005-024794 |
| Mar. 28, 2005 | (JP) | 2005-091080 |
| Mar. 28, 2005 | (JP) | 2005-091081 |

(51) Int. Cl.

| C09K 23/00 | (2022.01) |
|---|---|
| C09K 23/14 | (2022.01) |
| C09K 23/16 | (2022.01) |
| C10L 1/12 | (2006.01) |
| C10L 1/222 | (2006.01) |

(52) U.S. Cl.
CPC ............ *C09K 23/16* (2022.01); *C10L 1/1985* (2013.01); *C10L 1/125* (2013.01); *C10L 1/2222* (2013.01); *C10L 2200/043* (2013.01); *C10L 2200/0423* (2013.01); *C10L 2250/04* (2013.01); *C10L 2250/06* (2013.01); *C10L 2250/084* (2013.01); *Y10T 428/2982* (2015.01)

(56) References Cited

U.S. PATENT DOCUMENTS

| 4,911,928 | A | 3/1990 | Wallach |
| 5,055,228 | A | 10/1991 | Zabotto et al. |
| 5,154,854 | A | 11/1992 | Zabotto et al. |
| 5,160,669 | A | 11/1992 | Wallach et al. |
| 5,439,672 | A | 8/1995 | Zabotto et al. |
| 5,700,397 | A | 12/1997 | Maeda et al. |
| 5,804,216 | A | 9/1998 | Terren et al. |
| 5,853,711 | A | 12/1998 | Nakamura et al. |
| 6,080,211 | A | 6/2000 | Mathur |
| 6,264,741 | B1 | 7/2001 | Brinker et al. |
| 6,348,479 | B1 | 2/2002 | Mori et al. |
| 6,436,413 | B1 * | 8/2002 | Gers-Barlag ............ A61K 8/06 424/401 |
| 2005/0175757 | A1 * | 8/2005 | Buffet ...................... A23D 7/02 426/573 |
| 2005/0196416 | A1 * | 9/2005 | Kipp ...................... A61K 9/1075 424/400 |
| 2005/0232974 | A1 | 10/2005 | Gore |
| 2009/0043003 | A1 | 2/2009 | Tatsumi et al. |

FOREIGN PATENT DOCUMENTS

| JP | S57-94326 A | 6/1982 |
| JP | H06-121922 A | 5/1994 |
| JP | H07-070574 A | 3/1995 |
| JP | H09-234357 A | 9/1997 |
| JP | 2002-87903 A | 3/2002 |

OTHER PUBLICATIONS

Masayuki Akotsu et al. "HCO-10 Vesicle no Cation-ka ni yoru Kino Fuyo to Kotai Hyomen eno Kyuchaku Tokusei", CSJ: The Chemical Society of Japan Koen Yokoshu, vol. 82, p. 83, (Sep. 2002).

Kazuo Tajima, "Netsurikigakuteki ni Kano na Phospholipid no Sanso Nyukakei", Hyomen (Hyomen Danwakai, Colloid Konwakai), vol. 37, No. 11, pp. 611-622, (Nov. 1999).

Kyoko Tsutsui et al., "NH4DMPC de Chosei shita Sanso Kyukakei Emulsion to Sono Tokusei" CSJ: The Chemical Society of Japan Koen Yokoshu, vol. 79, p. 454, (Mar. 2001).

Nobuyuki Ojiie et al., "DMPC-kaimen Kasseizaikei ni yoru Sanso Nyuka Gensho to Nano Emulsion no Keisei ni tsuite", CSJ: The Chemical Society of Japan Koen Yokoshu, vol. 82, p. 83, (Sep. 2002).

Janos H. Fendler, "*Characterizations and Applications of Micelles, Microemulsions, Monolayers, Bilayers, Vesicles, Host-guest Systems, and Polyios*", Membrane Mimetic Chemistry, A wiley Insterscience Publication, pp. 510-511.

Communication from European Patent Office in connection with European Patent Application No. 05727301.3 dated Sep. 16, 2010 (EPO).

K. Tajima et al., "*Solubilization of hydrocarbons into a bilayer assembly of dimyristoylphosphatidylcholine in water*", Colloids and Surfaces, A: Physicochemical and Engineering Aspects 155, Elsevier Science B.V., pp. 311-322 (1999).

H. Kunieda et al., "Phase behaviour of polyoxyethylene hydrogenated castor oil in oil/water system", Colloids and Surfaces, A: Physicochemical and Engineering Aspects 109, Elsevier Science B.V., pp. 209-216 (1996).

Kazuo Tajima, Yoko Imai, Akio Nakamura, Masakatsu Toshinuma, Solubilization of hydrocarbons into a bilayer assembly of dimyristoylphosphatidylcholine in water, Colloids and Surfaces, 155 (1999) 311-322.

Y. Imai et al., "Trial production of emulsion fuel with light-oil by three-phase emulsification and its properties," The 57th Divisional Meeting on Colloid and Surface Chemistry with the 2004 Japan-Australia International Symposium, p 420, The Division of Colloid and Surface Chemistry, the Chemical Society of Japan (Aug. 2004).

Office Action issued in Japanese Application No. 2010-284573, dated Oct. 20, 2014.

* cited by examiner

Coalescence

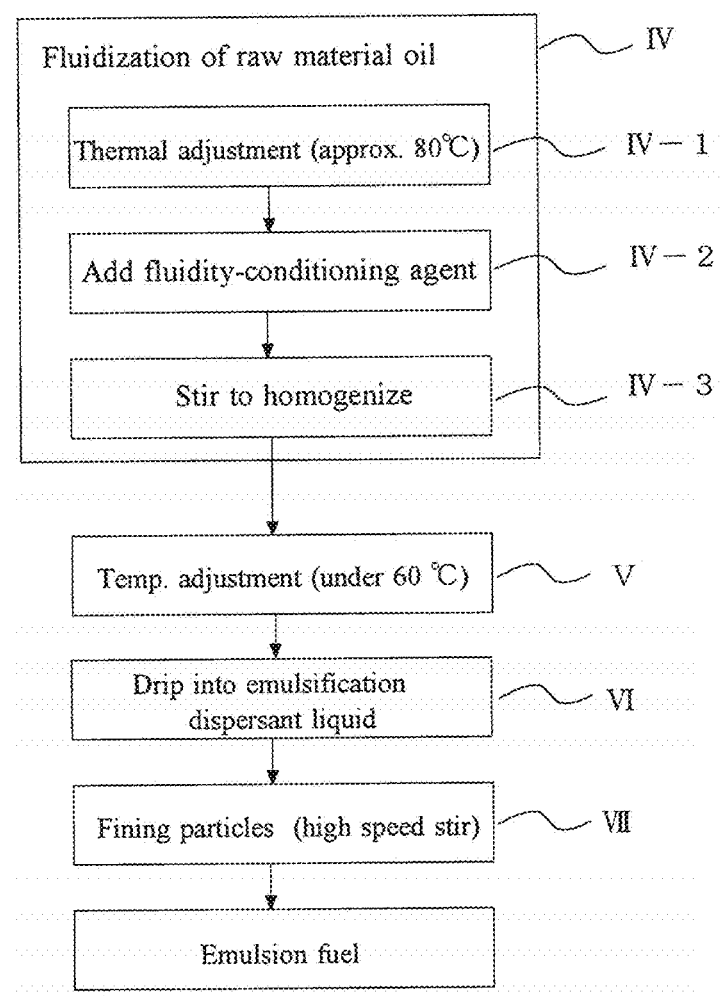

Emulsions using conventional surfactants

Emulsions using the three-phase emulsification method

FIG.10

Photographs for emulsification example ② of heavy oil A with HCO-10

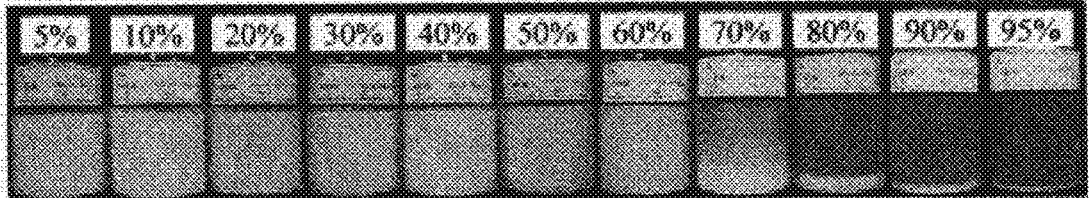

The figures show the concentration of the oil phase

FIG.11

Photographs for emulsification example ⑤ of light oil with HCO-10

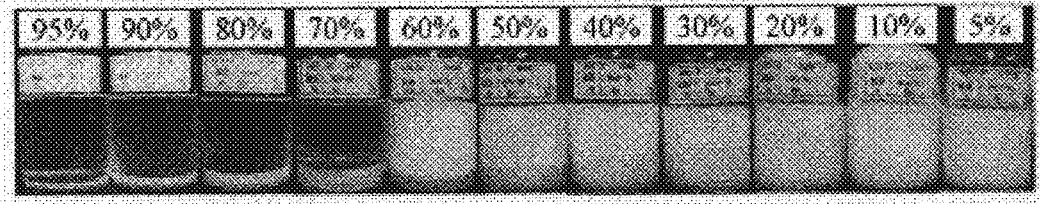

The figures show the concentration of the oil phase

FIG.12

Photographs for emulsification example ⑥ of light oil at various concentrations of HCO-10

The figures show the concentration of HCO-10 in the emulsifier dispersion

EMULSIFICATION DISPERSANTS, A METHOD FOR EMULSIFICATION AND DISPERSION USING THE EMULSIFICATION DISPERSANTS, EMULSIONS, AND EMULSION FUELS

CROSS-REFERENCE TO RELATED APPLICATION

This is a divisional of U.S. application Ser. No. 11/547,625 which is a nationalization application under 35 U.S.C. § 371 of PCT/JP2005/005795 filed on Mar. 29, 2005, claiming priority to JP 2004-110915 filed Apr. 5, 2004, JP 2004-254384 filed Sep. 1, 2004, JP2004-257363 filed Sep. 3, 2004, JP 2004-327915 filed Nov. 11, 2004, JP 2005-024792 filed Feb. 1, 2005, JP 2005-024794 filed Feb. 1, 2005, JP 2005-091080 filed Mar. 28, 2005 and JP 2005-091081 filed Mar. 28, 2005, the contents of which are incorporated herein by reference in their entirety.

TECHNICAL FIELD

The present invention relates to emulsification dispersants with excellent long term stability regardless of the type of substance to be emulsified, and a method for emulsification and dispersion using the emulsification dispersants, emulsions, and emulsion fuels.

BACKGROUND ART

Conventionally, the emulsification and dispersion of functional oil based agents or functional granules into water were conducted by selecting a surfactant according to the required HLB of the functional oil based agents or properties of granule surface. In addition, the required HLB value of the surfactant used as an emulsifier had to be chosen distinctively according to whether O/W type emulsions or W/O type emulsions were to be formed; moreover, the thermal stability and the long term stability were not sufficient, and therefore, various different types of surfactants also had to be used. (ref. Non-patent document 1-4).

Furthermore, conventionally, in exhaust gases from thermal engines (automobiles, power generators, ships, air planes, etc.) using light oil, etc. as fuel, there have been problems involving the inevitable generation of CO or NOx, in addition to PM (carbon particulates) or VOC (α-Biphenyl, etc.). For this reason, independent municipalities have set regulation standards (e.g. below 100-110 ppm), and it has been reported that emulsion fuels to which 50 wt % water has been added are capable of serving as a technical solution to this problem (Non-patent document 5, Non-patent document 6, etc.). Moreover, it is known that high viscosity heavy oils, such as distillation residue oils (tar, pitch, asphalt, etc.), oil sand, natural bitumens, orinoco tar, etc., cannot be used at normal temperature, but can be conditioned for fluidity by the addition of low viscosity petroleum fractions, etc., and the conditioned heavy oils can then be emulsified using a surfactant (Patent document 7).

Non-patent document 1: "Emulsion Science" edited by P. Sherman, Academic Press Inc. (1969)
Non-patent document 2: "Microemulsions-Theory and Practice" edited by Leon M. Price, Academic Press Inc. (1977)
Non-patent document 3: "A technique of Emulsification and Solubilization" by Atsushi, Tuji, Kougakutosho Ltd. (1976)
Non-patent document 4: "Development Technique for Functional Surfactants" CMC Publishing Co., Ltd. (1998)
Non-patent document 5: "A Reduction Effect of NOx and Graphite in the Exhaust Gases Generated from Water Emulsified Fuels" searched on Aug. 25, 2004 The internet URL: http://www.naro.affrc.go.jp/top/seika/2002/kanto/kan019.html
Non-patent document 6: "Application study of Water Emulsified Fuel on Diesel Engine" searched on Aug. 25, 2004 The internet URL: http://www.khi.co.jp/tech/nj132g05.htm Kawasaki Heavy Industries, Ltd. Kawasaki Technical Review No. 132
Patent document 7: Japanese Unexamined Patent Application Publication No. 07-70574

SUMMARY OF THE INVENTION

Problems to be Solved by the Invention

However, surfactants are not very biodegradable and produce a gas, thus causing serious problems of environmental pollution. Furthermore, although physicochemical emulsification methods such as the HLB method, phase inversion emulsification method, phase inversion temperature emulsification method, gel emulsification method, etc., have generally been used as conditioning methods for emulsified preparations of functional oil-based agents, in each case, because an action to thermodynamically stabilize the system by reducing the surface energy of the oil/water is the base of the emulsification conditioning process, the emulsification method was therefore accompanied by extremely complicated and extensive effort to select the most suitable emulsifier, and in any case, when a variety of oils had been mixed together, it was almost impossible for these oils to be stably emulsified.

Furthermore, fuels such as light oil, etc., are mixtures of a variety of hydrocarbon oils; therefore it is difficult to emulsify water-added fuels with conventional surfactants, and emulsion fuels that can be stabilized long term by surfactants have not yet been developed.

Moreover, conditioned heavy oils fluidized by the addition of a low viscosity petroleum fraction, etc. have not been widely used due to sedimentation and deposits in the transportation lines, or due to the environmental pollution resulting from incomplete combustion. In addition, the emulsion fuels, for which the conditioned heavy oils have been emulsified by surfactants, vary in composition and a satisfactory stability has not yet been achieved, even with the use of a large variety of surfactants.

Hence, the objective of the present invention is to create emulsification and dispersion systems with excellent thermal stability and long term stability for the surface of the functional oil-based agents/water or the functional granules/water, and to provide emulsification dispersants that permit emulsification and dispersion regardless of the Erforderich HLB value of the functional oil based agents or surface properties of the functional granules, as well as a method for emulsification and dispersion using the emulsification dispersants, and emulsions. As an applied example of the emulsions, an additional objective is to provide emulsion fuels that allow for a reduction of environmental effects and that have excellent long term stability.

Means for Solving the Problem

In emulsification methods using conventional surfactants, the basic method of emulsification and dispersion was to reduce the surface energy of the oil and water in which the surfactant was absorbed, and a large amount of emulsifier was required in order to lower the surface tension. In order to do this, the present inventors devised a three-phase method of emulsification involving the attachment of nanoparticles of an amphiphilic compound existing independently in an oil/amphiphilic compound/water system onto the surface of the oil-based agent by van der Waals force, and for such emulsification method, the degree of surface tension of the oil component/water was acknowledged to be crucial for the attachment of the nanoparticles of the emulsifier. The present inventors discovered that the emulsions of this three-phase emulsion method exhibit extremely high stability compared to the emulsions of the normal two-phase emulsion method, such as O/W or W/O type emulsions, and as a result, the present invention has been completed based on these findings.

That is, for the purpose of accomplishing said objective, emulsification dispersants related to the present invention are characterized in that the main component is vesicles that are formed from amphiphilic substances capable of forming vesicles spontaneously and that adhere onto the surface of an oil based material.

Herein, for the vesicles, the preferred average size is 8 nm-500 nm for the formation of emulsions, and 200 nm to 800 nm when the dispersant is being conditioned within a concentration range of 5 to 20 wt % in the dispersion. Additionally, for the amphiphilic substances with self-assembly capabilities as described above, it is preferable to adopt derivatives represented by the following general formula (Formula 1), wherein the average number of added ethylene oxide molecules (E) is between 5 and 15 among polyoxyethylene-hydrogenated caster oil derivatives, or those represented by the general formula (Formula 2), including halides of dialkylammonium derivatives, trialkylammonium derivatives, tetraalkylammonium derivatives, dialkenylammonium derivatives, trialkenylammonium derivatives, or tetraalkeylammonium derivatives. In addition, phospholipids or particles made from phospholipid derivatives may also be used.

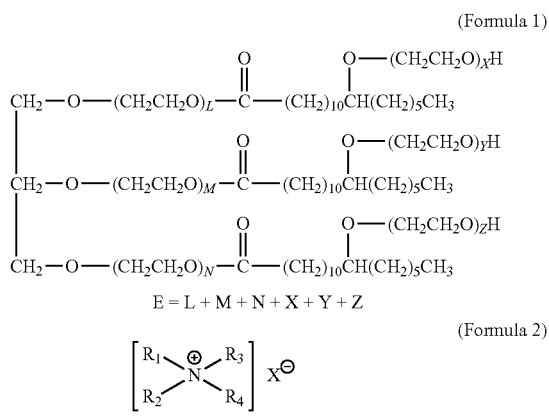

Herein, as for the polyoxyethylene-hydrogenated caster oil derivatives, ionic surfactants may be further added within the range of the mol fraction $0.1 \leq Xs \leq 0.33$, and the vesicles may be ionized (cationized or anionized).

For an emulsification dispersion method using the emulsification dispersant described above, it is preferable to have the oil components emulsified and said emulsification dispersant mixed by a ratio of 1 to 1000.

Furthermore, in order to accomplish said objective, the dispersants used in the present invention may be those containing as a main component a biopolymer disintegrated into single particles.

Herein, as for the biopolymers, microbially produced polysaccharides, phospholipids and polyesters, naturally-derived polysaccharides, such as starch, and one or more than two selected from a family of chitosans may be considered. For example, as the microbially produced polysaccharides, provided for example are those produced by microorganisms comprising several sugars among the monosaccharides, such as ribose, xylose, rhamnose, fructose, glucose, mannose, glucuronic acid, and gluconic acid, as the structural elements. Some microorganisms that produce polysaccharides with these particular structures are known; however, any polysaccharide or mixture of such may be acceptable.

Furthermore, examples of the naturally-derived starches include, but are not limited to, potatoes, glutinous rice powder, tapioca powder, and kelp powder, etc., and a simple substance or compound structure with amphiphilic properties may also be acceptable.

For the emulsification dispersion method using the emulsification dispersant described above, it is preferable to have the oil component emulsified and said emulsification dispersant mixed by a ratio of 50 to 2000.

In addition, a preferable method for producing the emulsification dispersant described above is to include a process of forming vesicles that are formed from amphiphilic substances capable of forming vesicles spontaneously, or a process of disintegrating the amphiphilic substance capable of self-assembly into single particles, and processing the amphiphilic substance that has been either dispersed into vesicles or disintegrated into single particles into fine particles by adding to water of the designated temperature. The forming process for forming vesicles that are formed from amphiphilic substances capable of forming vesicles spontaneously, and the disintegrating process into single particles requires various ingenuities depending on the materials used, but using caster oil derivatives, it is achievable by addition into water below 60° C. while stirring.

As for the emulsions obtained by mixing said emulsification dispersant with the oil/fat, an emulsification dispersant phase will be formed on the interface of the oil and water, thus they are unlikely to merge together, regardless of the type of oil/fat used, and the thermal stability and long term stability will be excellent.

Emulsion fuels are provided as examples of such emulsions. The emulsion fuels are characterized in that water added fuels contain as an essential component an emulsification dispersant comprised of vesicles that are formed from amphiphilic substances capable of forming vesicles spontaneously and that adhere onto the surface of the oil based material, and wherein the average particle size of said vesicles is 8 nm to 500 nm when the emulsion is being formed, and 200 nm to 800 nm when the dispersant is being regulated within a concentration range of 5 to 20 wt % in the dispersion.

Herein, light oil, heavy oil (Heavy oil A, Heavy oil C), petroleum, gasoline, etc, or viscosity-conditioned high viscosity heavy oils (distillation residue oil, oil sand, natural bitumens, orinoco tar, etc.) are assumed as the fuel, whereas for the amphiphilic substance capable of self-assembly, among the polyoxyethylene-hydrogenated castor oil derivatives represented by the following general formula (Formula 3), derivatives with an average number of 5 to 15 added ethylene oxide molecules are preferable for use.

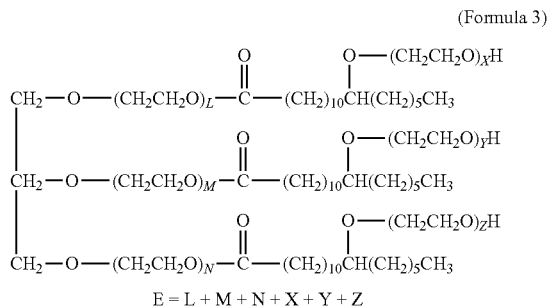

(Formula 3)

$$E = L + M + N + X + Y + Z$$

In order to maintain the CO or NOx value of the combustion gases according to said regulation standards, the preferred composition consists of an amphiphilic substance at 0.1 to 15.0 wt %, said fuel at 1 to 95 wt %, and the corresponding proportion of water according to the weight ratio.

If heavy oil A is used as the fuel, and among said derivatives, if a derivative (HCO-10) with an average number of 10 added ethylene oxide molecules is used as the amphiphilic substance, the recommended composition consists of HCO-10 at 0.1 to 14.25 wt %, heavy oil A at 5 to 95 wt %, and the corresponding proportion of water, and more preferably, a composition of HCO-10 at 5 to 14.25 wt %, heavy oil A at 5 to 50 wt % and the corresponding proportion of water is recommended.

If light oil is used as the fuel, and said HCO-10 is used as the amphiphilic substance, a composition consisting of HCO-10 at 0.4 to 10 wt %, light oil at 5 to 95 wt %, and the corresponding proportion of water, and more preferably, a composition consisting of HCO-10 at 0.8 to 10 wt %, light oil at 5 to 60 wt % and the corresponding proportion of water is recommended.

Furthermore, if heavy oil is used as the fuel, and said HCO-10 is used as the amphiphilic substance after undergoing a fluidization process with a viscosity-conditioning agent, a composition consisting of HCO-10 at 0.3 to 9 wt %, conditioned heavy oil at 80 to 10 wt % and the corresponding proportion of water, and more preferably, a composition consisting of HCO-10 at 0.3 to 9 wt %, conditioned heavy oil at 70 to 30 wt % and the corresponding proportion of water is recommended.

Additives such as anticorrosives, flame-retardant agents, and antiseptics, etc., may be arbitrarily mixed into said emulsion fuels depending on the purpose. Said three-phase emulsification technique may be applied to the mixed oils with synthetic oils, vegetable oils, etc., other than light or heavy oils.

Additionally, the preferred method for producing emulsification fuels described above includes a process for conditioning the fluidity of crude oils, a process for adjusting the temperature of the fluidity-conditioned crude to at or below the designated temperature, and a process for processing the crude oil of which the temperature was adjusted by said temperature adjustment process into fine particles by adding it dropwise into said emulsification dispersant liquid. Particularly for heavy oils, temperature control is important. After heating to approximately 80° C. to allow for fluidization of the heavy oil, the designated amount of viscosity-conditioned oil is added for homogenization. The viscosity therein may be controllable in accordance with the amount of the viscosity-regulated oil. However, when mixed with an emulsification dispersant, it is necessary to reduce the temperature to approximately 60° C. As described above, the gradually addition of a small amount of such viscosity-conditioned heavy oil or light oil, etc. into water and an emulsification dispersant for an emulsion fuel composition, after having been stirred, results in the formation of an emulsion fuel.

Effects of the Invention

As described, the use of emulsification dispersants related to the present invention permits the formation of functional oil based agents/water or functional granules/water emulsion systems with excellent thermal and long term stability. With conventional hydrocarbon-related surfactants, it was difficult to form stable emulsions; however, the use of emulsification dispersants in the present invention makes it possible to stabilize emulsions for a long period of time in a wide range of temperature regions.

Furthermore, with the use of one kind of emulsification dispersant, the emulsification and dispersion of an oil/fat component becomes possible regardless of the required HLB value of the oil agent to be emulsified or the surface properties of the functional granules, and therefore, emulsifications of hydrocarbon-based oil agents or silicone-based oil agents also becomes possible. This minimizes the complexity and efforts in selecting an emulsifier, and also allows for emulsification of a variety of mixed oils at the same time.

Moreover, the concentration of the emulsification dispersant required for an emulsification is only $1/10$ to $1/1000$ of conventional surfactants, thus significantly reducing the effect on the environment.

Furthermore, as for the fuel emulsions involved in the present invention, water-added light oil or heavy oil was prepared so as to contain an emulsification dispersant as an essential component mainly comprised of vesicles that are formed from amphiphilic substances capable of forming vesicles spontaneously and that adhere onto the surface of an oil based material; therefore, fuel emulsions with extremely excellent long term stability were formed, and moreover, the generated concentrations of NOx, CO, and HC (hydrocarbons) in exhaust gas are also reduced.

Through the use of the emulsion fuels of the present invention, longer life-spans of combustion engines may also be expected. In addition, through the use of the emulsion fuels of the present invention, a greater amount of $CO_2$ is generated than would be expected from the weight ratio of the fuel components, and the oxygen concentration is increased, thus achieving complete combustion while reducing the carbon particulates (PM) generated from incomplete combustion.

BRIEF DESCRIPTION OF THE DRAWINGS

FIGS. 1A and 1B illustrate an emulsification mechanism, of which FIG. 1A is a diagram illustrating an adsorption mechanism of a monomolecular film of a conventional surfactant, and FIG. 1B is a diagram illustrating an adherence mechanism of nanoparticles.

FIG. 8 is a block diagram that illustrates a manufacturing method for an emulsion fuel.

FIG. 10 is a photograph showing the emulsification state of Table 2.

FIG. 11 is a photograph showing the emulsification state of Table 5.

FIG. 12 is a photograph that showing the emulsification state of Table 6.

BEST MODE FOR CARRYING OUT THE INVENTION

Hereinafter, the ideal embodiments of the present invention are explained.

FIG. 1 conceptually illustrates an emulsification method with a conventional surfactant and the three-phase emulsification method adopted herein.

Figure 1A:
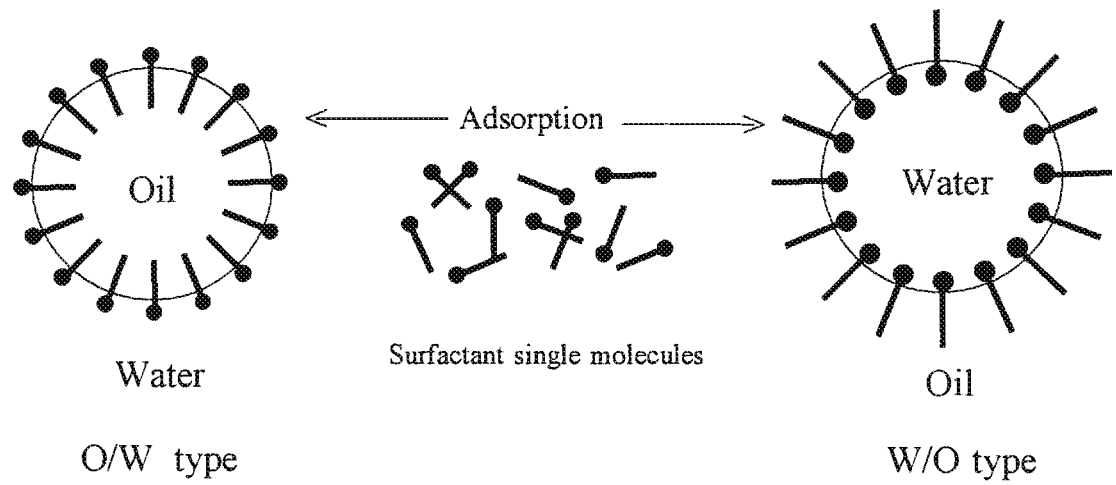

In an emulsification method using a conventional surfactant, as shown in FIG. 1A, in the same molecule, the surfactant has both hydrophilic and lipophilic groups, which are different in their nature. As for a hydrophilic emulsifier, the lipophilic groups of the surfactant are dissolved into the oil, while the hydrophilic groups are aligned outside the oil particle, thus the oil particle is likely to have affinity to water and mixed homogeneously in the aqueous medium to produce an O/W type emulsion. Whereas, for a lipophilic surfactant, the hydrophilic groups of the surfactant are oriented toward the water particles, while the lipophilic groups are aligned outside of the water particle, thus the water particle is likely to have affinity to the oil and mixed homogeneously in the oil medium to produce a W/O type emulsions.

Figure 2A:
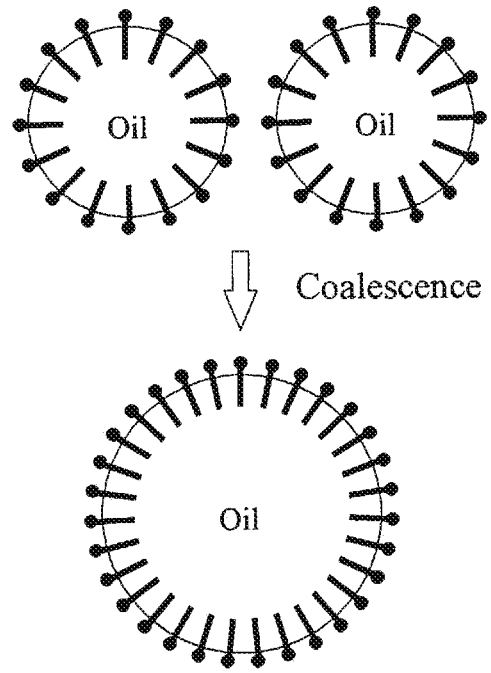
FIG. 2A is a diagram illustrating phenomena caused by a thermal collision with surfactant molecules of conventional adsorption type.

However, with such conventional emulsification method, the surfactant is adsorbed on the oil surface, forming an emulsified monomolecular film, and it is inconvenient that surface properties change depending on the type of the surfactant. Moreover, as shown in FIG. 2A, due to the coalescence caused by thermal collisions of the oil drops, the size of the oil drops gradually become larger, and finally, a separation of the oil and the surfactant aqueous solution takes place. In order to prevent this, it is necessary to form microemulsions for which a large amount of a surfactant must be used, and therefore is inconvenient.

Figure 1B:
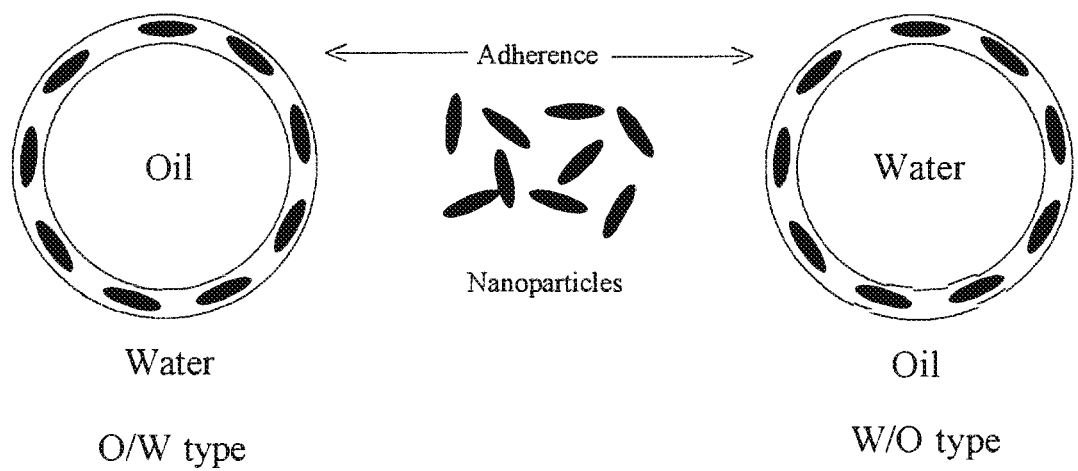
Figure 2B:
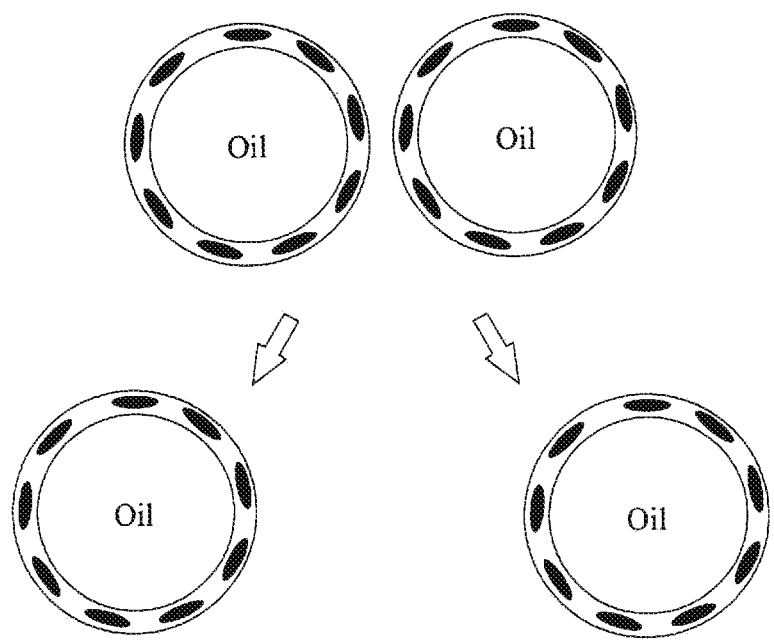
FIG. 2B is a diagram illustrating phenomena caused by a thermal collision with vesicles of emulsifier phase adherence type.

In the present invention, as shown in FIG. 1B, nanoparticles of an emulsifier phase attach to the oil or water particles, creating a three-phase structure consisting of aqueous phase—emulsification dispersant phase—oil phase, without lowering the surface energy and without any mutual solubility at interface, unlike conventional surfactants, and long term stability of an emulsion can be achieved by preventing the coalescence caused by thermal collisions as shown in FIG. 2B. Furthermore, based on such a mechanism, the method adopts a new emulsification method (three-phase emulsification method) that allows for the formation of emulsions using only a small amount of emulsification dispersant.

As for the emulsification dispersant, in order to realize such three-phase emulsification, an emulsification dispersant mainly comprised of vesicles that are formed from amphiphilic substances capable of forming vesicles spontaneously and that adhere onto the surface of an oil based material, or an emulsification dispersant mainly comprised of a biopolymer disintegrated into single particles have both been considered.

Figure 3:
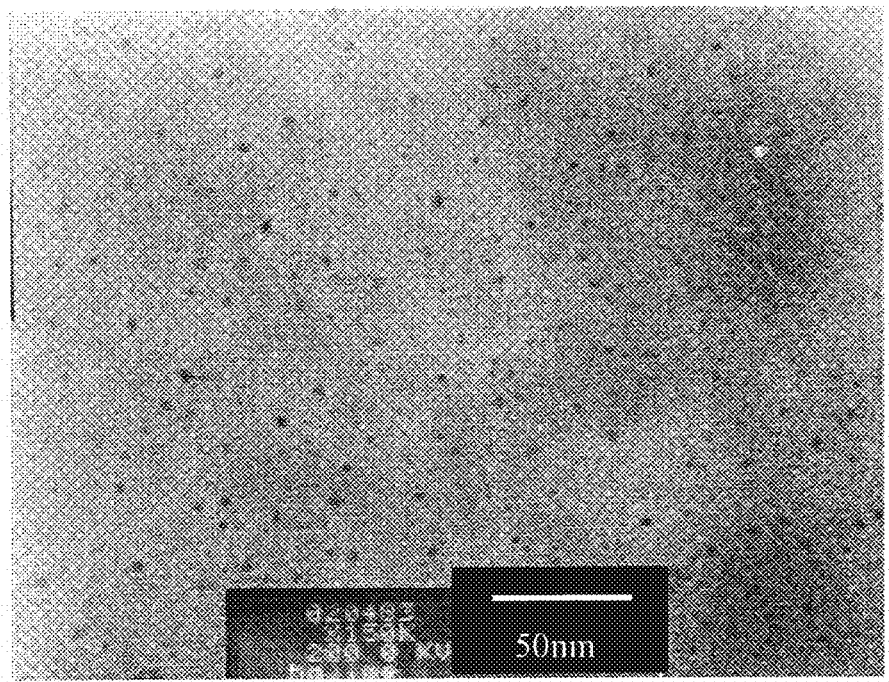
FIG. 3 is a TEM photograph of DMPC-C14TAB emulsifier particles (Xs=0.5, equimolar mixture).
Figure 4:
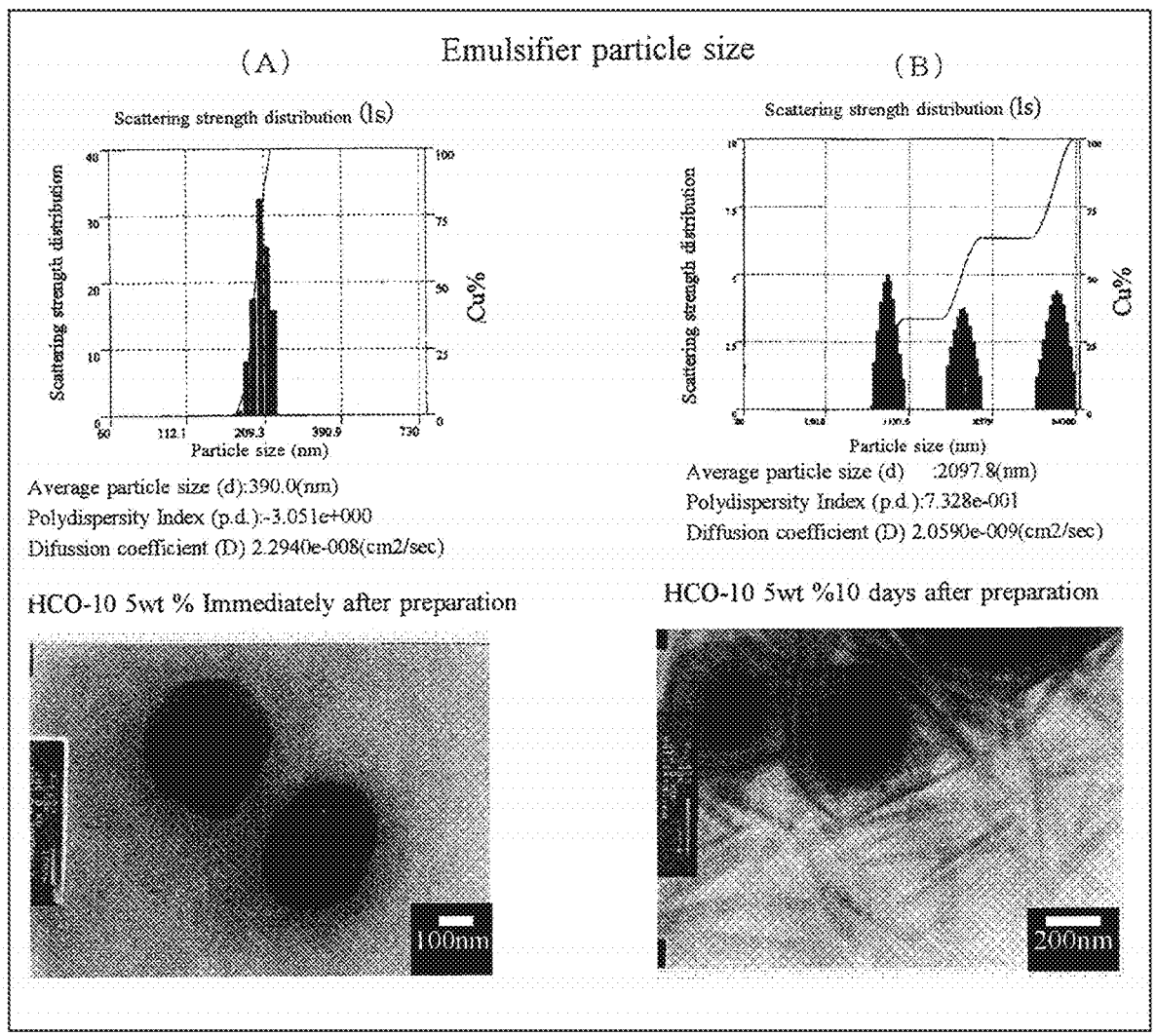
FIG. 4 is a distribution of scattering strength and TEM photographs of DMPC-C14TAB emulsifier particles with an average particle size of 390.0 nm (A) and 2097.8 nm (B).

The preferred average particle size of the vesicles formed from an amphiphilic substance is between 8 nm and 500 nm. A particle size smaller than 8 nm reduces the suction action attributed to the Van der Waals force, thereby impeding the vesicles from adhering onto the surface of the oil drops; however, if the particle size is larger than 500 nm, stable emulsions will not be maintained. In FIG. 3, a TEM photograph is shown representing a particle size of 8 nm. Moreover, if the particle size is larger than 500 nm when the emulsion is being formed, needle-shaped particles will be generated, and therefore, stable emulsions will not be maintained. In FIG. 4, distributions of scattering strength and TEM photographs of an average particle size of 390.0 nm (smaller than 500 nm: (A) in the figure) and of an average particle size of 2097.8 nm (larger than 500 nm: (B) in the figure) are shown.

Figure 5:
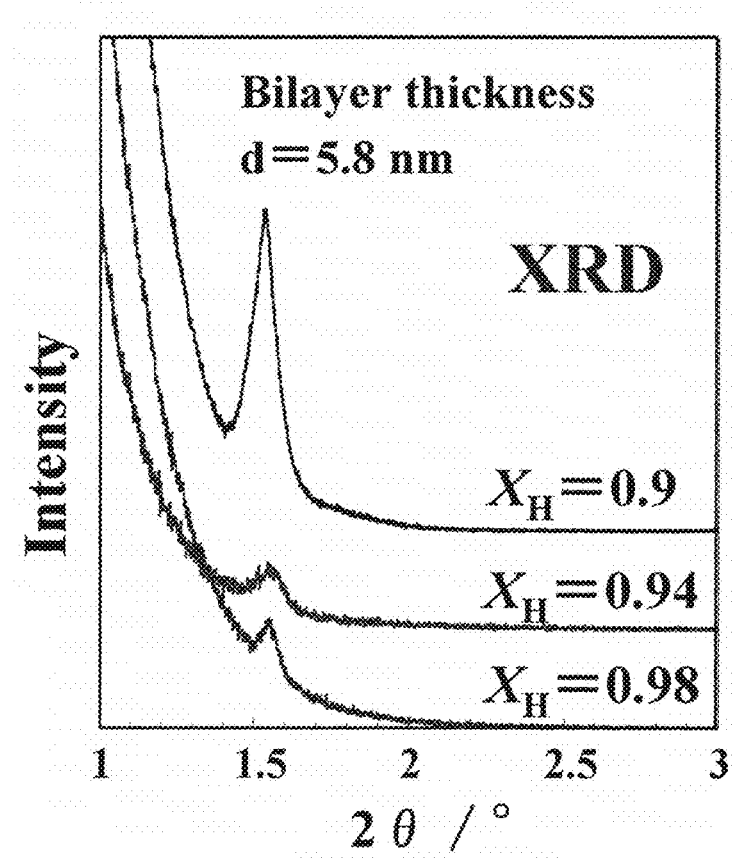
FIG. 5 is a figure showing observation results of an XRD peak of an emulsification by adding oil into 0.5 wt % of DMCP-C14TAB liquid crystals mixed with water.

In order to maintain the particle size of the vesicles within this range while an emulsion is formed, a range of 200 nm to 800 nm when the dispersant is being conditioned within a concentration range of 5 to 20 wt % in the dispersion is acceptable for conditioning of the dispersant. This is due to the fact that vesicles are processed into fine particles during the emulsion formation process. By observing the XRD peak in FIG. 5, it is confirmed that the vesicles have not been destroyed in this process. In the figure, $X_H$ represents the mol fraction of the oil phase to the emulsifier.

For the amphiphilic substances forming such vesicles, it is preferable to adopt polyoxyethylene-hydrogenated caster oil derivatives represented by the following general formula (Formula 4), or dialkylammonium derivatives represented by the general formula (Formula 5), including halides of trialkylammonium derivatives, tetraalkylammonium derivatives, dialkenylammonium derivatives, trialkenylammonium derivatives, or tetraalkeylammonium derivatives.

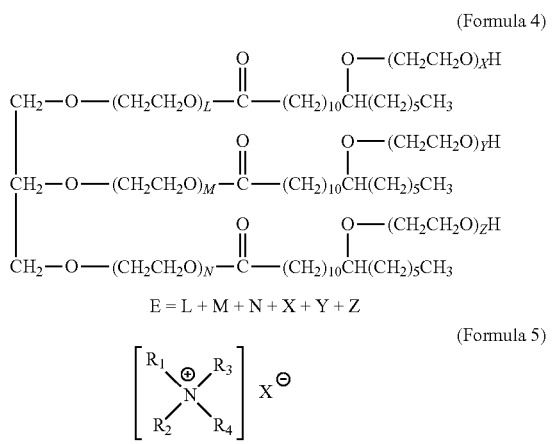

(Formula 4)

$E = L + M + N + X + Y + Z$ (Formula 5)

$$\left[ \begin{array}{c} R_1 \diagdown \overset{\oplus}{N} \diagup R_3 \\ R_2 \diagup \phantom{N} \diagdown R_4 \end{array} \right] X^{\ominus}$$

$R_1$, $R_2$: Alkyl or alkenyl group of $C_8$-$C_{22}$
$R_3$, $R_4$: H or alkyl group of $C_1$-$C_4$
X: F, Cl, Br or I As for the polyoxyethylene-hydrogenated caster oil derivatives, derivatives with an average number of 5 to 15 added ethylene oxide molecules (E) may be used. An example wherein the average number of added ethylene oxide molecules has been changed from 5 to 20 is shown in Table 1. The range between 5 and 15 is stable; however, at 20, an emulsion formation is possible for a few days, but the stability cannot be maintained. In order to enhance the adhering strength, the vesicles to be obtained may be ionized. In forming such ionized vesicles as ionic surfactants, for the cationization, the use of alkyl or alkenyltrimethyl-ammonium salt (with a carbon chain length of 2 to 22), preferably hexadecyltrimethylammonium bromide (hereinafter called CTAB), wherein the carbon chain length is 16, for the anionization, alkylsulphate ($CnSO_4^-M^+$ with a carbon chain length of 8 to 22, M: alkali metals, alkaline earth, ammonium salt, etc.) is recommended. As for the method of ionization, for example, mix HCO-10 and CTAB with an ethanol solvent, remove the ethanol to form a mixture of HCO10 and CTAB, and then, add distilled water into the mixture so that HCO-10 becomes 10 wt %, and stir to incubate in a temperature-controlled container. In the mixed vesicles of HCO-10 and CTAB, if the CTAB mol fraction (Xs) is Xs≤0.1, coherent cationic properties of the mixed vesicles cannot be maintained, while if it is 0.33≤Xs, stable mixed vesicles cannot be obtained, and thus, a range of 0.1≤Xs≤0.33 is preferred for the cationization.

TABLE 1

| An example of heavy oil A emulsification with HCO-5. | | | | | |
|---|---|---|---|---|---|
| | No. | | | | |
| | 1 | 2 | 3 | 4 | 5 |
| HCO-5 | 2 | 2 | 2 | 2 | 2 |
| Water | 78 | 58 | 38 | 18 | 8 |
| Heavy oil A | 20 | 40 | 60 | 80 | 90 |
| Emulsification stability (After 1 day) | ○ | ○ | Δ | Δ | Δ |
| Emulsification stability (After 7 days) | ○ | Δ | Δ | Δ | Δ |
| Emulsified state | W/O type emulsion | | | | |
| An example of heavy oil A emulsification with HCO-15. | | | | | |
| | No. | | | | |
| | 1 | 2 | 3 | 4 | 5 |
| HCO-5 | 2 | 2 | 2 | 2 | 2 |
| Water | 78 | 58 | 38 | 18 | 8 |
| Heavy oil A | 20 | 40 | 60 | 80 | 90 |
| Emulsification stability (After 1 day) | ○ | ○ | ○ | ○ | ○ |
| Emulsification stability (After 7 days) | ○ | ○ | ○ | Δ | Δ |
| Emulsified state | O/W type emulsion | | | W/O type emulsion | |
| An example of heavy oil A emulsification with HCO-20. | | | | | |
| | No. | | | | |
| | 1 | 2 | 3 | 4 | 5 |
| HCO-5 | 2 | 2 | 2 | 2 | 2 |
| Water | 78 | 58 | 38 | 18 | 8 |
| Heavy oil A | 20 | 40 | 60 | 80 | 90 |
| Emulsification stability (After 1 day) | Δ | Δ | x | x | x |
| Emulsification stability (After 7 days) | x | x | x | x | x |
| Emulsified state | O/W type emulsion | | | W/O type emulsion | |

○: No phase separation,
Δ: Separated due to difference in specific gravity (coacervation),
x: Separated
Figures are shown in weight %

Furthermore, as for the amphiphilic substance that forms the vesicles, phospholipids or phospholipids derivatives, etc. may be used. For the phospholipids, among structures represented by the following general formula (Formula 6), DLPC with a carbon chain length of 12 (1, 2-Dilauroyl-sn-glycero-3-phospho-rac-1-choline), DMPC with a carbon chain length of 14 (1, 2-Dimyristoyl-sn-glycero-3-phospho-rac-1-choline) and DPPC with a carbon chain length of 16 (1, 2-Dialmitoyl-sn-glycero-3-phospho-rac-1-choline) may be used.

Figure 6:
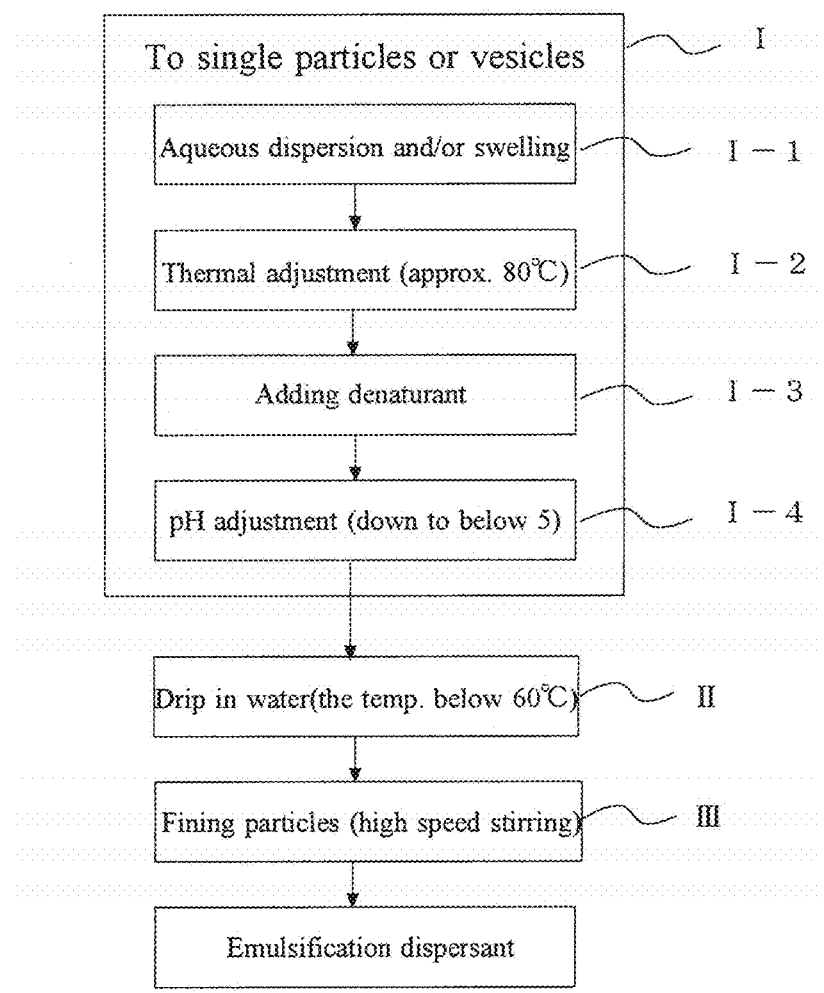
FIG. 6 is a block diagram describing a manufacturing method for an emulsification dispersant.

A method of producing the emulsification dispersant described above requires a process for dispersing an amphiphilic substance capable of self-assembly into vesicles (vesiclization), or a process for disintegrating into single particles (step I). This requires various ingenuities depending on the material used, however, as shown in FIG. 6, a process of water-dispersing or water-swelling the amphiphilic substance (step I-1), a process of thermally adjusting the temperature to approx. 80° C. (step I-2), a process of adding a denaturant such as urea to destroy the hydrogen bond (step

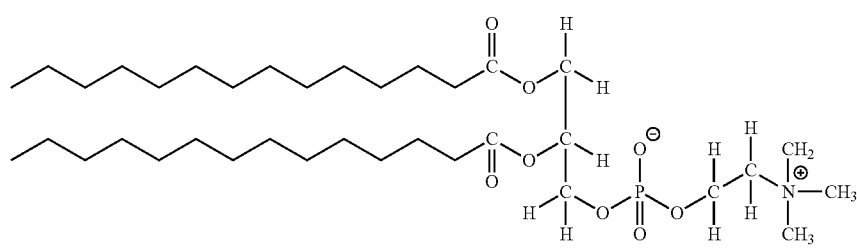

(Formula 6)

Additionally, among structures represented by the following general formula (Formula 7), DLPG with a carbon chain length of 12 (1, 2-Dilauroyl-sn-glycero-3-phospho-rac-1-glycerol) Na salt or $NH_4$ salt, DMPG with a carbon chain length of 14 (1, 2-Dimyristoyl-sn-glycero-3-phospho-rac-1-glycerol) Na salt or $NH_4$ salt, or DPPG (1, 2-Dipalmitoyl-sn-glycero-3-phospho-rac-1-glycerol) Na salt or $NH_4$ salt may also be used.

I-3), a process of conditioning the pH to below 5 (step I-4), any of such processes, or a combination of which may achieve disintegration into single particles, or vesiclization. Particularly with caster oil derivatives, disintegration is achievable by adding the caster oil derivative dropwise into water below 60° C. while stirring.

After a process for conditioning the designated concentration by addition into water below the designated tempera-

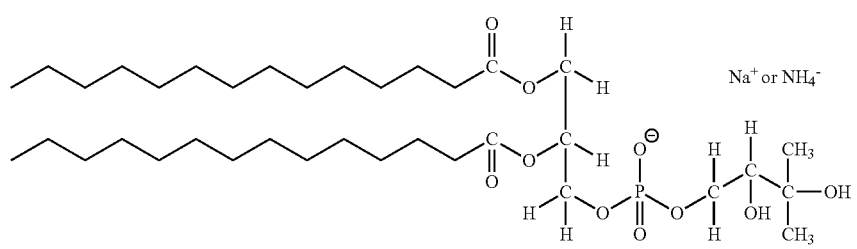

(Formula 7)

Furthermore, egg yolk lecithin or soybean lecithin may be used as phospholipids. Moreover, for the emulsification and dispersion of an oil component using an emulsification dispersant comprising said vesicles, it is recommended to have the oil component emulsified and said emulsification dispersant mixed with said oil component by a weight ratio of 4 to 200.

On the other hand, for biopolymers, provided for example are microbially produced biopolymers comprising as structure elements some sugars among the monosaccharides, such as ribose, xylose, rhamnose, fructose, glucose, mannose, glucuronic acid, and gluconic acid, etc. As for microorganisms that produce polysaccharides with these particular structures, *alcaligenes, xanthomonas, arthrobacter, bacillus, hansenula*, and brunaria are known, and any polysaccharide or mixture of such may be used. Gelatin or blockcopolymers may also be used in place of a biopolymer.

When emulsifying and dispersing an oil component using an emulsification dispersant comprising as the main component a biopolymer disintegrated into single particles, it is recommended that the oil component is emulsified and said emulsification dispersant mixed with said oil component by a weight ratio of 50 to 2000.

ture (below 60° C.) (step II), and a process for stirring to process the particles into fine particles (step III), an emulsification dispersant is produced. As for the stirring, stirring at a high speed (up to 16000 rpm, in lab.) is preferred; however, when using a stirring device, stirring at up to approximately 1,200 rpm will allow for processing in fewer minutes. In addition, it is preferable to perform the process of adding into the water and the process of processing the particles into fine particles at the same time. Biopolymers, etc. require a complicated process, since the network structures must be destroyed in order to disintegrate into single particles; however, these processes are individually described for each embodiment (embodiment 6, embodiment 8, embodiment 9, and embodiment 10).

Hereinafter, several embodiments of emulsification dispersants comprising as the main component vesicles formed from amphiphilic substances, and embodiments of emulsification dispersants comprising as a main component of biopolymers disintegrated into single particles are described.

Embodiment 1

An Embodiment Wherein Vesicles from Hydrogenated Caster Oil are Used as an Emulsification Dispersant As the vesicles from hydrogenated caster oil, among polyoxyethylene-hydrogenated caster oil derivatives, a derivative with an average number of 10 added ethylene oxide (EO) molecules (E) (from hereon HCO-10; molecular weight 1380 g/mol) is used.

It is known that the HCO-10 is hardly soluble in water and forms vesicles by assembling themselves in water (Ref "Regarding a Formation of Vesicles of Non-ionic Surfactant Related to Poly(oxyethylene) Hydrogenated Caster Oil" Journal of Japan Oil Chemist's Society, vol. 41, No. 12, P. 1191-1196, (1992), "Thermal Properties of Poly(oxyethylene) Hydrogenated Caster Oil Vesicle Dispersant Solution" Japan Oil Chemist's Society, vol. 41, No. 12, P 1197-1202, (1992)), as shown in Table 2, although the average particle size depends on the concentration; however, at the stage of aqueous dispersion the particle size is 200 nm to 800 nm. Considering the stability of the dispersion, the size was set in the range of 5 to 20 wt %.

TABLE 2

Average particle size at various concentration of HCO-10.

| Concentration (wt %) | Average particle size/nm | Most distributed particle size/nm | Second most distributed particle size/nm |
|---|---|---|---|
| 1 | 243.17 | 88.43 | |
| 3 | 321.13 | 205.63 | |
| 6 | 440.8 | 449.67 | 136.47 |
| 7 | 443.33 | 160.7 | |
| 8 | 473.33 | 136.1 | |
| 9 | 513.3 | 92.73 | 256.2 |
| 10 | 760.5 | 37.7 | 313.8 |
| 15 | 775 | 64.73 | 415.3 |
| 20 | 735.57 | 41.5 | 192.8 |

For the purpose of investigating an equivalent or better emulsification capability compared to conventional surfactants using such emulsification dispersant, a system of heavy oil A and water was used wherein the concentration of HCO-10 to water was set at 10 wt %, for which regular tap water was used for the water, and where the emulsification was conducted in room temperature by stirring for approximately five minutes at 8000 rpm using a homomixer. The emulsified state was examined by changing the weight ratio of the heavy oil A. The proportion of each composition of the hydrogenated caster oil (HCO-10)-water-heavy oil A, and the result of the emulsified state of the emulsions are shown in Table 3.

TABLE 3

Example (1) of emulsification with HCO-10.

| | No. | | | | | | | | | |
|---|---|---|---|---|---|---|---|---|---|---|
| | 1 | 2 | 3 | 4 | 5 | 6 | 7 | 8 | 9 | 10 |
| HCO-10 | 9 | 8 | 7 | 6 | 5 | 4 | 3 | 2 | 1 | 0.5 |
| Water | 81 | 72 | 63 | 54 | 45 | 36 | 27 | 18 | 9 | 4.5 |
| Heavy oil A | 10 | 20 | 30 | 40 | 50 | 60 | 70 | 80 | 90 | 95 |
| Emulsification stability (1 month/room temperature) | ○ | ○ | ○ | ○ | ○ | Δ | Δ | X | X | X |
| Emulsified state | (1) | | | | (2) | | | (3) | | |

Figure 7:
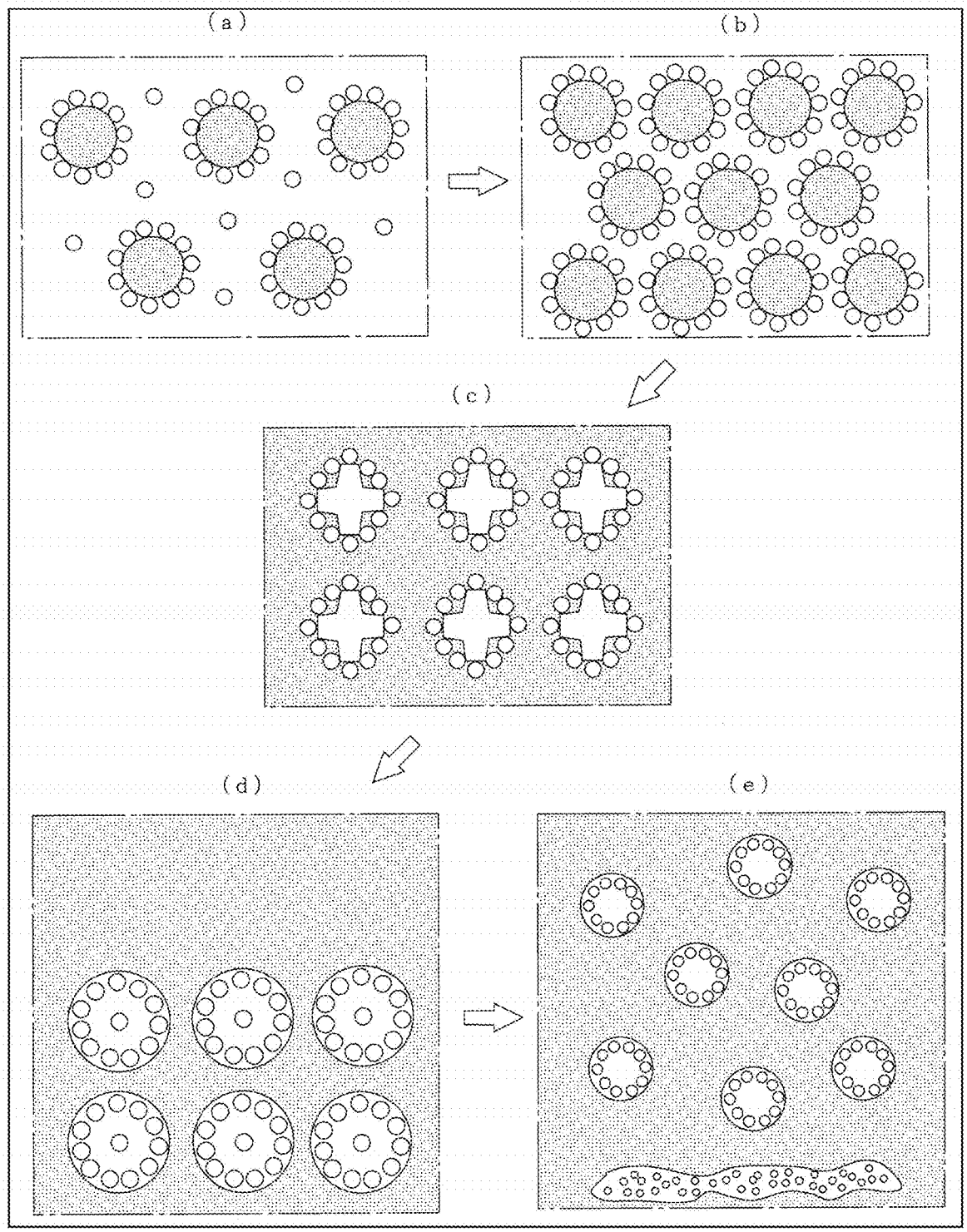
FIG. 7 illustrates patterns of differences in the emulsified states according to the oil content.

Figures are shown in weight %.
○: No phase separation,
Δ: Separated due to difference in specific gravity (coacervation),
X: Separated
(1): O/W type emulsion,
(2): W/O type emulsion,
(3): W/O microemulsion and separated aqueous phase As shown by these results, with a small amount of HCO-10, it was possible to emulsify up to 70 wt % of the heavy oil A. As shown in FIG. 7, in which the pattern changes of the emulsified states are shown after changing the proportion of the heavy oil A and the water, by increasing the proportion of the heavy oil A to water, from a diluted O/W type emulsion state (a) to a thick O/W type emulsion state, and after passing a transient state (c), then reaching a deposit W/O type emulsion state (d), when the proportion of the heavy oil A is exceeded, the reverse micro-emulsion state of (e) and a separate aqueous phase was formed. Said No. 1 to No. 5 are states of either (a) or (b), No. 6 and No. 7 are states of (d), and No. 8 through No. 10 correspond to states of (e). In addition, a characteristic of the invention was that in No. 6 and 7, apparently partial coacervation (creaming) was observed, which was redispersed by stirring moderately. However unlike the creaming state obtained by the conventional surfactant, a coalescence of oil drops was not observed, even after having been left to sit for an extended period of time.

Embodiment 2

For the purpose of examining the emulsified state of HCO-10 in a system of various types of oil agents, such as liquid paraffin and water, the concentration of the HCO-10, the emulsification dispersant of the water, and the concentration of the entire system were fixed as 10 wt % and 7 wt %, respectively, for which regular tap water was used for the water, and the emulsified state per each oil agent was examined after stirring for approximately five minutes by a normal stirrer at room temperature, thereby obtaining the results shown in Table 4.

TABLE 4

Emulsification example (2) with HCO-10

| Oil type | HCO-10 | Water | Emulsification stability (1 month/ room temperature) | Emulsified state |
|---|---|---|---|---|
| Liquid paraffin | 7 | 63 | ○ | O/W type |
| Olive oil | 7 | 63 | ○ | O/W type |
| Silicone (2 cSt) | 7 | 63 | ○ | O/W type |
| Silicone (5 cSt) | 7 | 63 | ○ | O/W type |
| Silicone (100 cSt) | 7 | 63 | ○ | O/W type |
| Isopropyl myristate | 7 | 63 | ○ | O/W type |

TABLE 4-continued

Emulsification example (2) with HCO-10

| Oil type | HCO-10 | Water | Emulsification stability (1 month/ room temperature) | Emulsified state |
|---|---|---|---|---|
| Hexadecane | 7 | 63 | ○ | O/W type |
| Limonene | 7 | 63 | ○ | O/W type |
| Tocopherol (Vitamin E) | 7 | 63 | ○ | O/W type |

Figures are shown in wt %.
Oil content is 30 wt %.

As seen from these result, a favorable emulsified state was obtained regardless of the type of oil agent. Moreover, since this emulsified state did not change even after having been left to incubate at room temperature for one month, excellent emulsions were obtained.

Embodiment 3

An Embodiment Wherein Distearyldimethylammoniumchloride is Used as the Emulsification Dispersant Next, an embodiment wherein distearyldimethylammoniumchloride is used as an emulsification dispersant is described. The emulsified state of liquid paraffin using this emulsification dispersant was examined, and the results are shown in Table 5. With approximately 0.5 wt % or over, a favorable state was obtained. Furthermore, even with silicone oil, a favorable state was obtained as shown in Table 6.

TABLE 5

| | No. | | |
|---|---|---|---|
| | 1 | 2 | 3 |
| Emulsifier | 0.5 | 2.5 | 5 |
| Water | 49.5 | 47.5 | 45 |
| Liquid paraffin | 50 | 50 | 50 |
| Emulsified state | O/W type | O/W type | O/W type |
| Emulsification stability (1 month/room temperature) | Δ | ○ | ○ |

Figures are shown in wt %.
○: No phase separation,
Δ: Separated due to difference in specific gravity (coacervation),
X: Separated

TABLE 6

| Emulsifier | 3.1 |
|---|---|
| Water | 59 |
| Silicone oil (2cs) | 37.9 |
| Emulsified state | O/W type |
| Emulsification stability (1 month/room temperature) | ○ |

Figures are shown in wt %.
○: No phase separation

Embodiment 4

An Embodiment Wherein Phospholipids are Used as the Emulsification Dispersant

Next, an embodiment wherein phospholipids are used as the emulsification dispersant is described.

The emulsified state when using said phospholipids (DMPC, DMPG, DPPC) was examined by changing the type of oil agents as shown in Table 7. With each oil agent, the oil composition was set within a range of 0.1 to 35 wt %, and regular tap water was used for the water, where a normal stirrer was used for the five minutes stirring at a room temperature. Furthermore, the concentration of the phospholipids was set in a range of 0.005 to 0.5 wt %.

TABLE 7

| Oil type | Phospholipids | Water | Emulsification Stability (1 month/room temperature) | Emulsified state |
|---|---|---|---|---|
| Liquid paraffin | 0.005-0.5 | 64.5-99 | ○ | O/W type |
| Olive oil | 0.005-0.5 | 64.5-99 | ○ | O/W type |
| Silicone (2 cSt) | 0.005-0.5 | 64.5-99 | ○ | O/W type |
| Silicone (5 cSt) | 0.005-0.5 | 64.5-99 | ○ | O/W type |
| Silicone (100 cSt) | 0.005-0.5 | 64.5-99 | ○ | O/W type |
| Octan | 0.005-0.5 | 64.5-99 | ○ | O/W type |
| Decane | 0.005-0.5 | 64.5-99 | ○ | O/W type |
| Dodecane | 0.005-0.5 | 64.5-99 | ○ | O/W type |
| Tetradecane | 0.005-0.5 | 64.5-99 | ○ | O/W type |
| Hexadecane | 0.005-0.5 | 64.5-99 | ○ | O/W type |
| Octadecane | 0.005-0.5 | 64.5-99 | ○ | O/W type |
| Benzene | 0.005-0.5 | 64.5-99 | ○ | O/W type |
| Nonylbenzene | 0.005-0.5 | 64.5-99 | ○ | O/W type |
| Limonene | 0.005-0.5 | 64.5-99 | ○ | O/W type |
| Tocopherol (Vitamin E) | 0.005-0.5 | 64.5-99 | ○ | O/W type |

Figures are shown in wt %.
Oil content is 0.1-35 wt %.

From these results, in emulsifications using phospholipids (DMPC, DMPG, and DPPC), favorable emulsified states were also obtained with a small amount of phospholipids, regardless of the type of oil agent. Moreover, the obtained emulsions had excellent thermal and long term stability with no changes in the emulsified state after having been left to incubate at room temperature for one month.

Embodiment 5

In addition, egg yolk lecithin was used as a phospholipid, and the emulsified state was examined for egg yolk lecithin and silicone oil, and egg yolk lecithin and hexadecane. The results are shown in Table 8. In the Table, the case of (1) is an embodiment wherein the egg yolk lecithin had been hydrogenated, and (2) is an embodiment wherein the egg yolk lecithin had not been hydrogenated. Also in these case, emulsions with excellent thermal and long term stability were obtained.

TABLE 8

| Oil type | Phospholipids | Amount of oil | Water | Emulsification stability (1 month/room temperature) | Emulsified state |
|---|---|---|---|---|---|
| Silicone (2 cSt) | (1) 0.3 | 33.8 | 65.9 | ○ | O/W type |
| Hexadecane | (2) 0.9 | 33 | 66.1 | ○ | O/W type |

Figures are shown in wt %.

Embodiment 6

An Embodiment Wherein a Biopolymer Disintegrated into Single Particles is Used as the Emulsification Dispersant Next, an embodiment in shown in which the emulsification dispersant comprises as a main component a biopolymer disintegrated into single particles For the biopolymer, among the microbially produced biopolymers described previously, a polysaccharide produced by *alcaligenes* was used. The polysaccharide forms a network structure when dispersed in water and becomes a viscous liquid; therefore, the network structure must be disintegrated into single particles. Then, the biopolymer aqueous solution, wherein the powder of the biopolymer was dispersed into a certain amount of water, was left all the day so as to make it swell, and then thermally adjusted for thirty minutes at 80° C., into which urea was added to destroy the hydrogen bonds of the biopolymer so as to disintegrate into single particles. It was possible to disintegrate a biopolymer of up to 0.1 wt % into single particles using an urea aqueous solution of 4 mol/dm$^3$.

In order to examine whether an aqueous dispersion of a biopolymer disintegrated into single particles has the same emulsification capability with oil agents as conventional surfactants, a liquid paraffin that is one of the hydrocarbon oils was used to examine the emulsification capability according to the dispersion concentration of the biopolymer as shown in Table 9, whereby it was possible to emulsify up to 70 wt % (water 30 wt %) for the concentration of liquid paraffin with aqueous dispersions of 0.05 wt % biopolymer. Moreover, the state of the emulsion did not show any changes elapsed after preparation and was extremely stable. In addition, when the biopolymer was set to be 0.04 wt % and the liquid paraffin to be 30 wt %, the temperature for the emulsification changed within a range of 25° C. to 75° C.; the formed emulsions were stable at any temperature.

TABLE 9

| Biopolymer | Amount of liquid paraffin (wt %) | | | | | |
|---|---|---|---|---|---|---|
| (wt %) | 10 | 30 | 50 | 60 | 70 | 80 |
| 0.01 | X | X | X | X | X | X |
| 0.05 | ○ | ○ | ○ | ○ | ○ | X |
| 0.09 | ○ | ○ | ○ | ○ | X | X |

Furthermore, while the concentration of liquid paraffin as an oil agent was set to be 30 wt %, the biopolymer concentration was changed in order to examine the emulsification capability of the biopolymer, and emulsification from 0.04 wt % was found to be possible.

Embodiment 7

Next, when the concentration of the biopolymer was set to be 0.04 wt % and the concentration of the oil agent to be 30 wt %, various kind of oils was changed to examine the effect on the emulsified state of the emulsion. The results are shown in Table 10. The oil agents used here were hexadecane, silicone, isopropylmyristate, squalane, olive oil, jojoba oil, cetostearyl alcohol, oleyl alcohol, and oleic acid. Though emulsion of oleic acid showed separation after several days, emulsion of the other oil agents was stable.

TABLE 10

| Oil type | Biopolymer | Water | Emulsification stability (1 months/room temperature) | Emulsified state |
|---|---|---|---|---|
| Hexadecane | 0.04 | 69.96 | ○ | O/W type |
| Silicone | 0.04 | 69.96 | ○ | O/W type |
| Isopropylmyristate | 0.04 | 69.96 | ○ | O/W type |
| Squalane | 0.04 | 69.96 | ○ | O/W type |
| Olive oil | 0.04 | 69.96 | ○ | O/W type |
| Jojoba oil | 0.04 | 69.96 | ○ | O/W type |
| Cetostearyl alcohol | 0.04 | 69.96 | ○ | O/W type |
| Oleyl alcohol | 0.04 | 69.96 | ○ | O/W type |
| Oleic acid | 0.005-0.5 | 64.5-99 | X | O/W type |

The figures are shown in wt %.
Oil content is 30 wt %.

From the above results, it has become apparent that a biopolymer has excellent emulsification capability, and even in low concentrations of 0.04 wt % the emulsion was stable, which is considered to be due to the single particles of the biopolymer adhering around the oil droplets creating an emulsification dispersant phase, and forming three-phase emulsion of aqueous phase—emulsification dispersant phase—oil phase.

Embodiment 8

The following example is a case in which naturally-derived starch is used as a biopolymer.

Potato starch, glutinous-rice powder, and tapioca powder (cassava potato powder) were used as the typical example of starch, and liquid paraffin and hexadecane were used as oil.

When conditioning the emulsifier, in order to disintegrate these starch into single particles, these starch were dispersed in water and heated to 90° C. with stirring, and then cooled down to room temperature so as to obtain a favorable dispersion, and from this operation a sugar polymer dispersion was obtained for use as the emulsifier.

Moreover, when conditioning the emulsions at room temperature after the operation of disintegration into single particles, the emulsions were conditioned by the addition of an oil phase with stirring as appropriate for the starch aqueous dispersion. The results are shown in Table 11 through Table 13.

TABLE 11

Example (1) for emulsified state using starch.

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| Potato starch | 0.18 | 0.16 | 0.14 | 0.12 | 0.1 | 0.08 | 0.07 | 0.06 | 0.05 | 0.04 | 0.02 |
| Water | 89.82 | 79.84 | 69.86 | 59.88 | 49.9 | 39.92 | 34.93 | 29.94 | 24.95 | 19.96 | 9.98 |
| Liquid paraffin | 10 | 20 | 30 | 40 | 50 | 60 | 65 | 70 | 75 | 80 | 90 |

TABLE 11-continued

Example (1) for emulsified state using starch.

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| Emulsification stability (1 month/room temperature) | Δ | Δ | Δ | Δ | Δ | Δ | ○ | ○ | ○ | ∇ | X |

Figures are shown in wt %
○: No phase separation,
Δ: Separated due to the difference in specific gravity with the O/W type emulsion (coacervation),
∇: Separated due to the difference in specific gravity with the W/O type emulsion (coacervation),
X: Separation of the W/O type emulsion and water

TABLE 12

Example (2) for emulsified state using starch.

| | No. | | | | | | | | |
|---|---|---|---|---|---|---|---|---|---|
| | 1 | 2 | 3 | 4 | 5 | 6 | 7 | 8 | 9 |
| Glutinous rice powder starch | 0.18 | 0.16 | 0.14 | 0.12 | 0.1 | 0.08 | 0.06 | 0.04 | 0.02 |
| Water | 89.82 | 79.84 | 69.86 | 59.88 | 49.9 | 39.92 | 29.94 | 19.96 | 9.98 |
| Liquid paraffin | 10 | 20 | 30 | 40 | 50 | 60 | 70 | 80 | 90 |
| Emulsification stability (1 month/room temperature) | Δ | Δ | Δ | Δ | ∇ | ∇ | ∇ | X | X |

Figures are shown in wt %
Δ: Separated due to the difference in specific gravity with the O/W type emulsion (coacervation),
∇: Separated due to the difference in specific gravity with the W/O type emulsion (coacervation),
X: Separation of the W/O type emulsion and water

TABLE 13

Example (3) for emulsified state according to different types of starch.

| Starch type | Emulsifier amount | Water | Emulsified state |
|---|---|---|---|
| Potato starch powder | 0.1 | 49.9 | ○ |
| Glutinous rice powder | 0.1 | 49.9 | ○ |
| Tapioca powder (cassava potato) | 0.5 | 49.5 | ○ |

Figures are shown in wt %
Oil: soybean oil 50 wt %

Embodiment 9

The Following Case is an Example of an Embodiment Wherein Chitosan is Used as the Biopolymer Liquid paraffin was used as the oil.

When conditioning the emulsifier, the chitosan was dispersed in water and acidified to below pH 5 in order to disintegrate chitosan into single particles. This operation apparently led to be transparent and chitosan was disintegrated into single particles, and a favorable dispersion was ultimately obtained. When forming the emulsion by at various pHs, pH adjustment was performed after disintegrating into single particles. Moreover, when forming the emulsions, after the operation of disintegration into single particles, the emulsions were formed by adding an oil phase with stirring suitable for the chitosan dispersion. The results are shown in Table 14. Additionally, the results obtained after adjusting the pH to 4, 7, and 10 are shown in Table 15.

TABLE 14

Emulsified state using chitosan.

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| Chitosan | 0.45 | 0.4 | 0.35 | 0.3 | 0.25 | 0.2 | 0.175 | 0.15 | 0.125 | 0.1 | 0.05 |
| Water | 89.55 | 79.6 | 69.65 | 59.7 | 49.75 | 39.8 | 34.83 | 29.85 | 24.88 | 19.9 | 9.95 |
| Liquid paraffin | 10 | 20 | 30 | 40 | 50 | 60 | 65 | 70 | 75 | 80 | 90 |
| Emulsification stability (1 month/room temperature) | Δ | Δ | Δ | Δ | Δ | Δ | ○ | ○ | ○ | Δ | X |

Figures are shown in wt %
○: No phase separation,
Δ: Separated due to the difference in specific gravity with the O/W type emulsion (coacervation),
∇: Separated due to the difference in specific gravity with the W/O type emulsion (coacervation),
X: Separation of the W/O type emulsion and water

TABLE 15

Effect of pH on emulsification using chitosan

| | No. | | |
|---|---|---|---|
| | 1 | 2 | 3 |
| pH | 4 | 7 | 10 |
| Emulsified state | Δ | Δ | ○ |

○: No phase separation,
Δ: Separated due to the difference in specific gravity with O/W type emulsion (coacervation)

Embodiment 10

The Following Case is an Embodiment Wherein Kelp Powder, a Naturally-Derived Polysaccharide is Used as the Biopolymer Fucoidan contained in kelp powder was used as a sugar polymer component.

When conditioning the emulsifier, kelp powder was dispersed in water and acidified to below pH 5 in order to disintegrate fucoidan into single particles.

Furthermore, when forming the emulsions after disintegrating into single particles, the emulsions were formed by adding an oil phase with stirring suitable for the kelp powder dispersion.

The results are shown in Table 16.

TABLE 16

Emulsified state using kelp powder.

| | No. | | | | | | | | |
|---|---|---|---|---|---|---|---|---|---|
| | 1 | 2 | 3 | 4 | 5 | 6 | 7 | 8 | 9 |
| Kelp powder | 0.45 | 0.4 | 0.35 | 0.3 | 0.25 | 0.2 | 0.15 | 0.1 | 0.05 |
| Water | 89.55 | 79.6 | 69.65 | 59.7 | 49.75 | 39.8 | 29.85 | 19.9 | 9.95 |
| Liquid paraffin | 10 | 20 | 30 | 40 | 50 | 60 | 70 | 80 | 90 |
| Emulsification stability (1 month/room temperature) | Δ | Δ | Δ | Δ | Δ | Δ | ∇ | ∇ | X |

Figures are shown in wt %
Δ: Separated due to the difference in specific gravity with the O/W type emulsion (coacervation),
∇: Separated due to the difference in specific gravity with the W/O type emulsion (coacervation),
X: Separation of the W/O type emulsion and water When an emulsification method (three-phase emulsification method) in which an emulsification dispersant comprising vesicles formed from an amphiphilic substance or a biopolymer disintegrated into single particles is used as the main component is compared to an emulsification method using a conventional surfactant, the following common characteristics were acknowledged.

First, in the conventional emulsification method, a surfactant was adsorbed onto interface of oil and water, and performed emulsion by lowering the interfacial energy of the oil/water. Secondly, the three-phase emulsification method is characterized in that an emulsification dispersant phase is constructed as a result of adherence of nanoparticles onto the interface of oil and water due to van der Waals force, thus permitting an emulsification without changing the interfacial energy regardless of the required HLB value of an oil based agent to be emulsified.

As a result, in an emulsification using conventional surfactant, coalescence were induced due to the thermal collision of oil droplets; on the other hand, in case of the three-phase emulsification, since the nanoparticles in the emulsifier phase adhered onto the surface of the oil droplets, even if they collided, coalescence were less likely to occur, then thermal stability was sustained for long period of time.

Furthermore, in the emulsification using conventional surfactants, the selection of an appropriate surfactant is required in accordance with the properties of the oil droplets; on the other hand, in the three-phase emulsification method, once the nanoparticles are selected, the same emulsifier may be used regardless of the type of oil droplets, thus also allowing for coexistence and mixture of emulsions with different types of oil agents.

Moreover, in the conventional emulsification method, because the oil droplets form microemulsions, a large amount of the surfactant was required, while in the three-phase emulsification method, emulsification was possible using only a low concentration of emulsification dispersant.

Additionally, in the three-phase emulsions described above, 1) a stable formation of large oil drops shaped like salmon roe is possible, 2) as for the creaming state being dependent on the difference in specific gravity, the emulsified state showed no difference even when the separated phase was removed, and 3) it was possible to form emulsions even with the addition of additives into the aqueous phase or into the oil phase of the three-phase emulsification.

Hereinafter, an embodiment wherein the emulsification dispersant realizing the three-phase emulsification described above is applied to emulsion fuels is described. The emulsion fuels in the present invention contain said emulsification dispersant as the essential component in the fuels: water-added oils; e.g. light oil, heavy oil (heavy oil A, heavy oil C), high viscosity heavy oil, kerosene, or gasoline, etc.

Herein, the preferred average particle size of the vesicles formed from an amphiphilic substance is 8 nm to 500 nm. A particle size smaller than 8 nm reduces the attractive force attributed to the van der Waals force, and then the vesicles may not adhere onto the surface of the oil, whereas, if the particle size is larger than 500 nm, stable emulsions cannot be maintained as previously described.

In order to maintain the particle size of the vesicles within this range while an emulsion is being formed, a range of 200 nm to 800 nm is acceptable for conditioning of the dispersant. Such particles size for emulsifier was due to a reason because the vesicles are processed into fine particles during the emulsion formation process.

For the amphiphilic substance forming such vesicles, polyoxylene-hydrogenated caster oil derivatives represented by the general formula (Formula 4) are to be used.

For hydrogenated caster oil derivatives, derivatives with an average number of 5 to 15 added ethylene oxide molecules (E) may be used. Furthermore, in order to enhance the thermal stability of said vesicles depending on the purpose, other ionic surfactants, amphoteric surfactants or other nonionic surfactants may be used together with said emulsification dispersant.

Moreover, for the method of producing emulsion fuels described above, particularly with high viscosity heavy oil, temperature control is crucial. That is, for emulsion fuels in which high viscosity oils such as heavy oil, etc. are used, processes are required for conditioning the fluidization (step IV), and for adjusting the temperature in order to reduce the temperature of the fluidity-conditioned high viscosity oil to the designated temperature (below 60° C.) (step V).

As shown in FIG. 8, a process for conditioning the fluidization (step IV) is achievable by: a process for thermally adjusting the temperature to approximately 80° C. so as to permit fluidization of the crude oil (step IV-1), followed by a process for adding a required amount of oil of which the viscosity is to be conditioned (step IV-2), and a process for homogenization by stirring (step IV-3). The viscosity during homogenization is controllable depending on the amount of oil to be added. Moreover, the temperature to be reached during the temperature adjustment in step IV-1 does not necessarily have to be 80° C., provided it is mixable with the oil; however when using high viscosity oils such as heavy oils, etc., the temperature must be reduced down to approximately 60° C. or below when mixing with the emulsification dispersant. Therefore, when using high viscosity oils, after the process of fluidity-conditioning, a process for temperature adjustment (step V) is required to reduce the temperature of the fluidity-conditioned crude oil to the designated temperature (below 60° C.). The processes in step IV and step V may be omitted depending on the crude oil used.

Subsequently, the emulsion fuel is generated after a process of adding the crude oil to be fluidized into the emulsification dispersant liquid (step VI) and a process of stirring for process the particles into fine particles (step VII). That is, the gradual addition of a small amount of fluidity-conditioned heavy oil or light oil, etc., into water and an emulsification dispersant for the emulsion fuel composition, after having been stirred, results in creation of the emulsion fuel. A high speed of stirring (up to 16000 rpm, in lab.) is preferred; however, any stirring speed is acceptable as long as an increase in temperature is not observed. It is also preferable to perform the process of adding into the water and the process of processing the particles into fine particles at the same time.

Embodiment 11

Hereinafter, an embodiment is described wherein emulsion fuels are formed, along with the emulsification of water and light oil or heavy oil A, using an emulsification dispersant comprising as the main component vesicles formed from an amphiphilic substance.

An attempt was made to emulsify a commercially produced light oil, and a heavy oil A using regular tap water. For the emulsification dispersant, among polyoxyethylene-hydrogenated caster oil derivatives forming hydrophilic nanoparticles, a dispersion was used wherein a derivative with an average number of 10 added ethylene oxide (EO) molecules (from hereon HCO-10; molecular weight 1380 g/mol) was dispersed with water. As previously described, HCO-10 is known to be hardly soluble in water and forms vesicles by assembling themselves in water, as shown in Table 2, and although the average particle size depends on the concentration, at the stage of aqueous dispersion, the size is 200 nm to 800 nm. Considering the stability of the dispersion, the concentration was set within a range of 5 to 20 wt %. No surfactant was used.

As for the emulsifying machine, a conventional homogenizer was used, and as for the combustion, a combustion device with a burner designated for kerosene was used, and the five components ($NO$, $CO$, $SO_2$, $CO_2$, and $O_2$) of combustion exhaust gases were monitored automatically.

A fuel was added to the HCO-10 aqueous dispersion and stirred for ten minutes by the homogenizer at 16000 rpm to prepare the emulsion. The composition of the emulsion in a weight ratio is HCO-10 at 5 wt %, oil phase at 50 wt %, and water at 45 wt %.

Figure 9A:
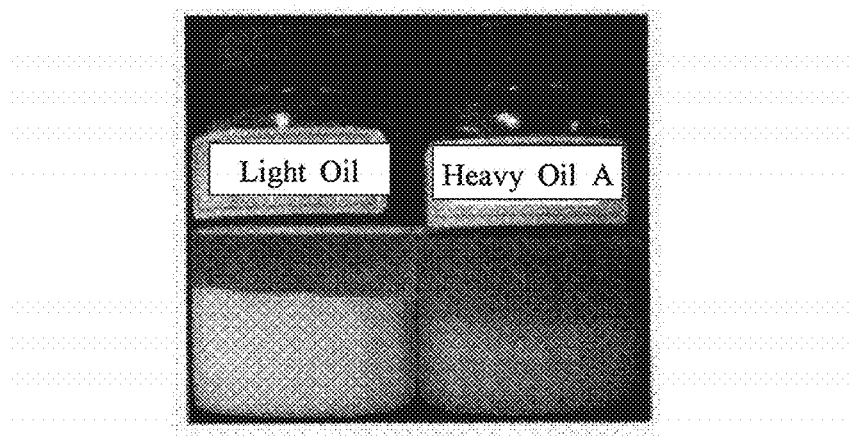
FIG. 9A is a photograph showing a state of an emulsion that has been left for two days after conditioning a light oil and a heavy oil A using a conventional surfactant.
Figure 9B:
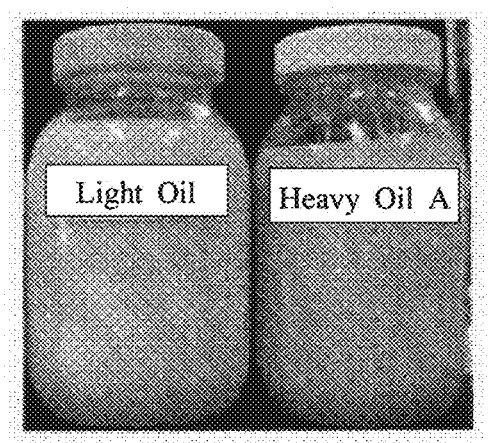
FIG. 9B is a photograph showing a state of an emulsion that has been left for thirty days after conditioning a light oil and a heavy oil A using the three-phase emulsification method.

In FIGS. 9A and 9B, after forming the emulsions of light oil and heavy oil A using a conventional surfactant and the emulsions of light oil and heavy oil A using the three-phase emulsification method of the present invention, the results are shown for the state of the emulsion using the surfactant two days later, and for the state of the emulsion using the three-phase emulsification method thirty days later (the state remained the same after two months). As seen from the figure, the emulsion using the conventional surfactant showed a complete phase separation, whereas the emulsion using the three-phase emulsification method remained extremely stable over time, even without the use of additives other than the HCO-10 emulsification dispersant.

Furthermore, after changing the weight ratio of HCO-10, oil phases (heavy oil A, light oil) and water, and stirring to regulate the emulsions, the states of one week after and one month after were observed in room temperature.

Examples of emulsification with heavy oil A is shown in Table 17 through Table 19. Furthermore, the photographs representing the emulsified states in Table 18 are shown in FIG. 10. In the short term, emulsions were formed with the HCO-10 at 0.5 wt % and the oil phase at 95 wt %; however, when the oil phase exceeded 80 wt %, changes in the time dependence were observed.

TABLE 17

Examples (1) of Heavy oil A emulsification using 10 wt % HCO-10 aqueous dispersion

| | No. | | | | | | | | | |
|---|---|---|---|---|---|---|---|---|---|---|
| | 1 | 2 | 3 | 4 | 5 | 6 | 7 | 8 | 9 | 10 |
| HCO-10 | 9 | 8 | 7 | 6 | 5 | 4 | 3 | 2 | 1 | 0.5 |
| Water | 81 | 72 | 63 | 54 | 45 | 36 | 27 | 18 | 9 | 4.5 |
| Heavy oil A | 10 | 20 | 30 | 40 | 50 | 60 | 70 | 80 | 90 | 95 |
| Emulsification stability (7 days/room temperature) | ○ | ○ | ○ | ○ | ○ | ○ | Δ | Δ | Δ | Δ |
| Emulsification stability (1 month/room temperature) | ○ | ○ | ○ | ○ | ○ | ○ | Δ | X | X | X |
| Emulsified state | | | (1) | | | | (2) | | (3) | |

Figures are shown in wt %.
○: No phase separation,
Δ: Separated due to the difference in specific gravity (coacervation),
X: Separated
(1): O/W type emulsion,
(2): W/O type emulsion,
(3): W/O microemulsion

TABLE 18

Examples (2) of heavy oil A emulsification using 15 wt % HCO-10 aqueous dispersion

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| HCO-10 | 14.3 | 13.5 | 12 | 10.5 | 9 | 7.5 | 6 | 4.5 | 3 | 1.5 | 0.75 |
| Water | 80.8 | 76.5 | 68 | 59.5 | 51 | 42.5 | 34 | 25.5 | 17 | 8.5 | 4.25 |
| Heavy Oil A | 5 | 10 | 20 | 30 | 40 | 50 | 60 | 70 | 80 | 90 | 95 |
| Emulsification stability (7 days/room temperature) | ○ | ○ | ○ | ○ | ○ | ○ | ○ | Δ | Δ | Δ | Δ |
| Emulsification stability (1 month/room temperature) | ○ | ○ | ○ | ○ | ○ | ○ | ○ | Δ | X | X | X |
| Emulsified state | | | | (1) | | | | (2) | | (3) | |

Figures are shown in wt %.
○: No phase separation,
Δ: Separated due to the difference in specific gravity (coacervation),
X: Separated
(1): O/W type emulsion,
(2): W/O type emulsion,
(3): W/O microemulsion

TABLE 19

Examples (3) of Heavy oil A emulsification at various concentrations of HCO-10

| HCO-10 Concentration | Water | Heavy oil A | Emulsified state | |
|---|---|---|---|---|
| | | | After 1 day | After 20 days |
| 0.1 | 39.9 | 60 | ○ | Δ |
| 0.2 | 39.8 | 60 | ○ | Δ |
| 0.4 | 39.6 | 60 | ○ | Δ |
| 0.6 | 39.4 | 60 | ○ | ○ |
| 0.8 | 39.2 | 60 | ○ | ○ |
| 1 | 39 | 60 | ○ | ○ |
| 2 | 38 | 60 | ○ | ○ |
| 4 | 36 | 60 | ○ | ○ |

TABLE 19-continued

Examples (3) of Heavy oil A emulsification at various concentrations of HCO-10

| HCO-10 Concentration | Water | Heavy oil A | Emulsified state After 1 day | After 20 days |
|---|---|---|---|---|
| 6 | 34 | 60 | ○ | ○ |
| 10 | 30 | 60 | ○ | ○ |

Figures are shown in wt %.

○: No phase separation,

Δ: Separated due to the difference in specific gravity (coacervation)

As seen from the above results, a composition comprised of HCO-10 at 0.1-14.25 wt %, heavy oil A at 5-95 wt % and the corresponding proportion of water, and preferably a composition comprised of HCO-10 at 5-14.25 wt %, heavy oil A at 5-60 wt % and the corresponding proportion of water are recommended.

Emulsification examples with light oil are shown in Table 20 through Table 23. In addition, photographs representing the emulsified states of Table 22 are shown in FIG. 11, and photographs representing the emulsified states of Table 23 are shown in FIG. 12. In these case, with the oil phase exceeds 80 wt %, a stable emulsion could not be formed. However, no changes were observed over time.

TABLE 20

Example (1) of light oil emulsification with 10 wt % HCO-10 aqueous dispersion

| | No. | | | | | | | | | |
|---|---|---|---|---|---|---|---|---|---|---|
| | 1 | 2 | 3 | 4 | 5 | 6 | 7 | 8 | 9 | 10 |
| HCO-10 | 9 | 8 | 7 | 6 | 5 | 4 | 3 | 2 | 1 | 0.5 |
| Water | 81 | 72 | 63 | 54 | 45 | 36 | 27 | 18 | 9 | 4.5 |
| Light oil | 10 | 20 | 30 | 40 | 50 | 60 | 70 | 80 | 90 | 95 |
| Emulsification stability (7 days/room temperature) | ○ | ○ | ○ | ○ | ○ | ○ | Δ | X | X | X |
| Emulsification stability (90 days/room temperature) | ○ | ○ | ○ | ○ | ○ | ○ | Δ | X | X | X |
| Emulsified state | | | (1) | | | | (2) | | (3) | |

Figures are shown in wt %.

○: No phase separation,

Δ: Separated due to the difference in specific gravity (coacervation),

X: Separated (1): O/W type emulsion, (2): W/O type emulsion, (3): W/O micro emulsion and separated aqueous phase

TABLE 21

Example (2) of light oil emulsification with 10 wt % HCO-10 aqueous dispersion

| | No. | | | | | | | | |
|---|---|---|---|---|---|---|---|---|---|
| | 1 | 2 | 3 | 4 | 5 | 6 | 7 | 8 | 9 |
| HCO-10 | 4.5 | 4 | 3.5 | 3 | 2.5 | 2 | 1.5 | 1 | 0.5 |
| Water | 85.5 | 76 | 66.5 | 57 | 47.5 | 38 | 28.5 | 19 | 9.5 |
| Light oil | 10 | 20 | 30 | 40 | 50 | 60 | 70 | 80 | 90 |
| Emulsification stability (7 days/room temperature) | ○ | ○ | ○ | ○ | ○ | ○ | X | X | X |
| Emulsification stability (90 days/room temperature) | ○ | ○ | ○ | ○ | ○ | ○ | X | X | X |
| Emulsified state | | | (1) | | | | | (3) | |

Figures are shown in wt %.

○: No phase separation,

Δ: Separated due to the difference in specific gravity (coacervation),

X: Separated (1): O/W type emulsion, (3): W/O micro emulsion and separated aqueous phase

TABLE 22

Example (5) of light oil emulsification with 10 wt % HCO-10 aqueous dispersion

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| HCO-10 | 0.95 | 0.9 | 0.8 | 0.7 | 0.6 | 0.5 | 0.4 | 0.3 | 0.2 | 0.1 | 0.05 |
| Water | 94.1 | 89.1 | 79.2 | 69.3 | 59.4 | 45.5 | 39.4 | 29.7 | 19.8 | 9.9 | 4.95 |
| Light oil | 5 | 10 | 20 | 30 | 40 | 50 | 60 | 70 | 80 | 90 | 95 |
| Emulsification stability (7 days/room temperature) | ○ | ○ | ○ | Δ | Δ | Δ | Δ | X | X | X | X |

TABLE 22-continued

Example (5) of light oil emulsification with 10 wt % HCO-10 aqueous dispersion

| | No. | | | | | | | | | | |
|---|---|---|---|---|---|---|---|---|---|---|---|
| | 1 | 2 | 3 | 4 | 5 | 6 | 7 | 8 | 9 | 10 | 11 |
| Emulsification stability (90 days/room temperature) | ○ | ○ | ○ | Δ | Δ | Δ | Δ | X | X | X | X |
| Emulsified state | | (1) | | | | (2) | | | (3) | | |

Figures are shown in wt %.
○: No phase separation,
Δ: Separated due to the difference in specific gravity (coacervation),
X: Separated
(1): O/W type emulsion,
(2): W/O type emulsion,
(3): W/O micro emulsion and separated aqueous phase

TABLE 23

Example (4) of light oil emulsification at various concentrations of HCO-10.

| HCO-10 Concentration | Water | Light oil | Emulsified state |
|---|---|---|---|
| 0.5 | 49.5 | 50 | Δ |
| 1 | 49 | 50 | Δ |
| 2.5 | 47.5 | 50 | ○ |
| 5 | 45 | 50 | ○ |
| 10 | 40 | 50 | ○ |

Figures are shown in wt %.
○: No phase separation,
Δ: Separated due to the difference in specific gravity (coacervation)

As shown by the above results, a composition consisting of HCO-10 at 0.4-10.0 wt %, light oil at 5-95 wt % and the corresponding proportion of water, and preferably a composition consisting of HCO-10 at 0.8-10.0 wt %, light oil at 5-60 wt %, and the corresponding proportion of water are recommended.

In the examples so far, cases were shown using light oil and heavy oil A; furthermore, in the examples of emulsification with gasoline, kerosene, and heavy oil C, as shown in Table 24, stable emulsified states have also been observed using a small amount of emulsification dispersant.

TABLE 24

Examples of the emulsified state according to different oils.

| Oil type | HCO-10 | Water | Emulsified state |
|---|---|---|---|
| Gasoline | 5 | 45 | ○ |
| kerosene | 5 | 45 | ○ |
| Heavy oil C | 5 | 45 | ○ |

Figures are in wt %.
Oil content is 50 wt %.

An emulsification with high viscosity heavy oil has to go through a viscosity-conditioning process. As for the viscosity-conditioning agent to be used therein, light oil, low viscosity oil obtained as a distillate from the oil refining process, or heavy oil A is preferred; however, as long as homogeneously mixable with high viscosity heavy oil, oil type need not be particularly limited.

Figure 13:
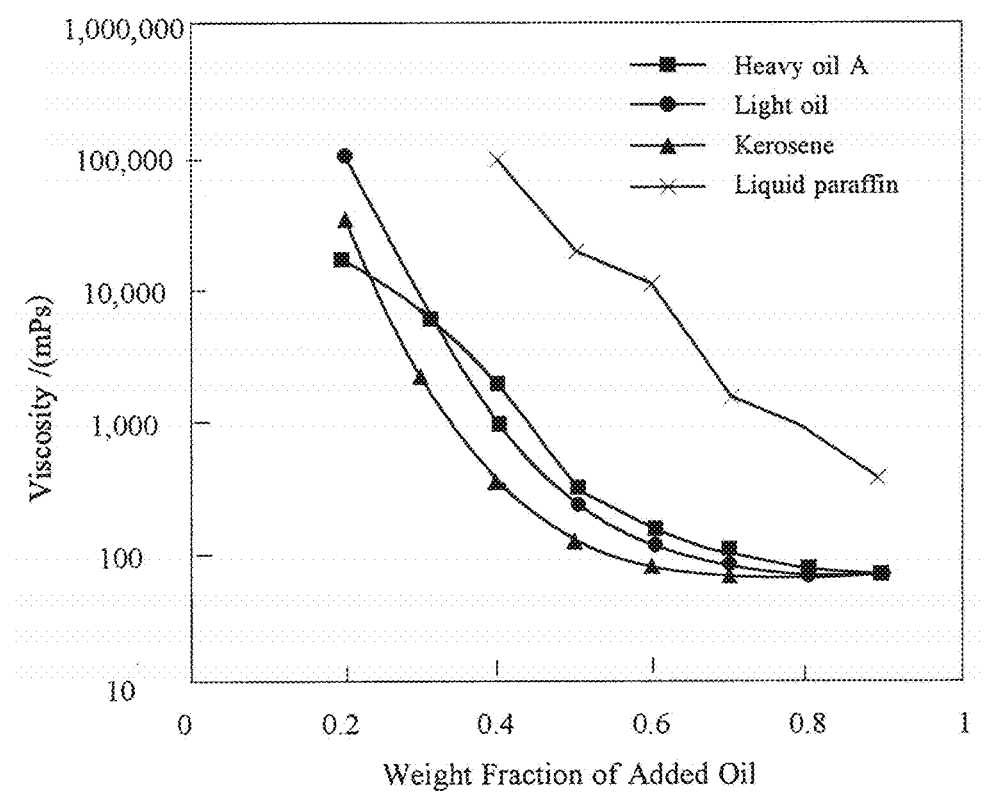
FIG. 13 shows the results of viscosity conditioning conducted with kerosene, light oil, heavy oil A, and liquid paraffin.

In Table 25 and in FIG. 13, the results of the viscosity conditioning using petroleum, light oil, Heavy oil A, and liquid paraffin are shown.

TABLE 25

| Viscosity of each type of conditioned heavy oil | | | | | | | | | |
|---|---|---|---|---|---|---|---|---|---|
| kerosene | 10 | 20 | 30 | 40 | 50 | 60 | 70 | 80 | 90 |
| Residue oil | 90 | 80 | 70 | 60 | 50 | 40 | 30 | 20 | 10 |
| Viscosity (mPs) | — | 33383 | 2250 | 341 | 122 | 76 | 65 | 61 | 61 |
| Viscosity of heavy oil conditioned with light oil | | | | | | | | | |
| Light oil | 10 | 20 | 30 | 40 | 50 | 60 | 70 | 80 | 90 |
| Residue oil | 90 | 80 | 70 | 60 | 50 | 40 | 30 | 20 | 10 |
| Viscosity (mPs) | — | 98980 | 7005 | 922 | 230 | 112 | 71 | 61 | 61 |
| Viscosity of heavy oil conditioned with heavy oil A | | | | | | | | | |
| Heavy oil A | 10 | 20 | 30 | 40 | 50 | 60 | 70 | 80 | 90 |
| Residue oil | 90 | 80 | 70 | 60 | 50 | 40 | 30 | 20 | 10 |
| Viscosity (mPs) | — | 16900 | 6536 | 1794 | 317 | 147 | 92 | 75 | 66 |
| Viscosity of heavy oil conditioned with liquid paraffin | | | | | | | | | |
| Liquid paraffin | 10 | 20 | 30 | 40 | 50 | 60 | 70 | 80 | 90 |
| Residue oil | 90 | 80 | 70 | 60 | 50 | 40 | 30 | 20 | 10 |
| Viscosity (mPs) | — | — | — | 95064 | 19788 | 10384 | 1461 | 849 | 339 |

—: immeasurable (20° C., B-type viscometer, Rotor No. 3 is used)
Viscosity of heavy oil conditioned with kerosene In FIG. 13, up to approx. 30,000 mPs does not cause a handling problem in the next process. As for an emulsification example in which 40 wt % of liquid paraffin was used as the viscosity-conditioning agent, although the emulsification itself was possible, subsequent handling was difficult due to unfavorable fluidity.

Furthermore, results of the emulsifications of a conditioned heavy oil using heavy oil A added at 30 wt % as a viscosity conditioning agent and 10 wt % HCO-10 aqueous dispersion are shown in Table 26 and Table 27.

TABLE 26

An emulsification example of conditioned heavy oil (Heavy oil A 30 wt %) with 10 wt % HCO-10 dispersion

| | No. | | | | | | | | | |
|---|---|---|---|---|---|---|---|---|---|---|
| | 1 | 2 | 3 | 4 | 5 | 6 | 7 | 8 | 9 | 10 |
| HCO-10 | 9 | 8 | 7 | 6 | 5 | 4 | 3 | 2 | 1 | 0.5 |
| Water | 81 | 72 | 63 | 54 | 45 | 36 | 27 | 18 | 9 | 4.5 |
| Conditioned heavy oil | 10 | 20 | 30 | 40 | 50 | 60 | 70 | 80 | 90 | 95 |
| Emulsification stability (1 month/room temperature) | ○ | ○ | ○ | ○ | ○ | ○ | ○ | Δ | X | X |

Figures are shown in wt %
○: No phase separation,
Δ: Separated due to the difference in specific gravity (coacervation),
X: Separated

TABLE 27

An emulsification example of conditioned heavy oil with various concentration of HCO-10.

| HCO-10 Concentration | Water | Conditioned heavy oil | Emulsified state |
|---|---|---|---|
| 0.5 | 49.5 | 50 | ○ |
| 1 | 49 | 50 | ○ |
| 2.5 | 47.5 | 50 | ○ |
| 5 | 45 | 50 | ○ |
| 0.3 | 29.7 | 70 | ○ |
| 1.5 | 28.5 | 70 | ○ |
| 3 | 27 | 70 | ○ |

Figures are shown in wt %.
○: No phase separation,
Δ: Separated due to the difference in specific gravity (coacervation)
Viscosity conditioning agent: heavy oil A, Heavy oil A/high viscosity heavy oil wt ratio = 3/7

In addition, examples of emulsification experiments wherein petroleum, light oil, and liquid paraffin were used as viscosity-conditioning agents are shown in Table 28, Table 29, and Table 30.

TABLE 28

Emulsification example (1) of each type of conditioned heavy oil with 10 wt % HCO-10 dispersion.

| | Oil type | | | |
|---|---|---|---|---|
| | kerosene/ heavy oil | Light oil/ heavy oil | Heavy oil A/ heavy oil | Liquid paraffin/ heavy oil |
| Viscosity conditioning agent/ Heavy oil | 30/70 | 30/70 | 30/70 | 40/60 |
| Conditioned heavy oil | 50 | 50 | 50 | 50 |
| Water | 45 | 45 | 45 | 45 |
| HCO-10 | 5 | 5 | 5 | 5 |

TABLE 28-continued

Emulsification example (1) of each type of conditioned heavy oil with 10 wt % HCO-10 dispersion.

| | Oil type | | | |
|---|---|---|---|---|
| | kerosene/ heavy oil | Light oil/ heavy oil | Heavy oil A/ heavy oil | Liquid paraffin/ heavy oil |
| Emulsification stability (1 month/room temperature) | ○ | ○ | ○ | Δ |

Figures are shown in wt %.
○: No phase separation (good fluidity)
Δ: No phase separation (fluidity defect)

TABLE 29

Emulsification example (2) of each type of conditioned heavy oil with 10 wt % HCO-10 dispersion.

| | Oil type | | | |
|---|---|---|---|---|
| | kerosene/ heavy oil | Light oil/ heavy oil | Heavy oil A/ heavy oil | Liquid paraffin/ heavy oil |
| Viscosity conditioning agent/ Heavy oil | 30/70 | 30/70 | 30/70 | 40/60 |
| Conditioned heavy oil | 70 | 70 | 70 | 70 |
| Water | 27 | 27 | 27 | 27 |
| HCO-10 | 3 | 3 | 3 | 3 |
| Emulsification stability (1 month/room temperature) | ○ | ○ | ○ | Δ |

Figures are shown in wt %.
○: No phase separation (good fluidity)
Δ: No phase separation (fluidity defect)

TABLE 30

Emulsification example (3) of each type of conditioned heavy oil with 10 wt % HCO-10 dispersion.

| | Oil type | | |
|---|---|---|---|
| | kerosene/ heavy oil | Light oil/ heavy oil | Heavy oil A/ heavy oil |
| Viscosity conditioning agent/ Heavy oil | 50/50 | 50/50 | 50/50 |
| Conditioned heavy oil | 70 | 70 | 70 |
| Water | 27 | 27 | 27 |
| HCO-10 | 3 | 3 | 3 |
| Emulsification stability (1 month/room temperature) | ○ | ○ | ○ |

Figures are shown in wt %.
○: No phase separation (good fluidity)
Δ: No phase separation (fluidity defect)

As shown by the above results, a composition consisting of HCO-10 at 0.3-9 wt %, conditioned heavy oil at 80-10 wt % and the corresponding proportion of water, and preferably a composition consisting of HCO-10 at 0.3-9 wt %, conditioned heavy oil at 70-30 wt+% and the corresponding proportion of water are recommended.

Combustion experiments using a light oil emulsion and a heavy oil A emulsion were individually conducted. Using a combustion device specifically designated for kerosene, without modifying the burner, the emulsion fuels were completely burnt without extinguishing.

Figure 14:
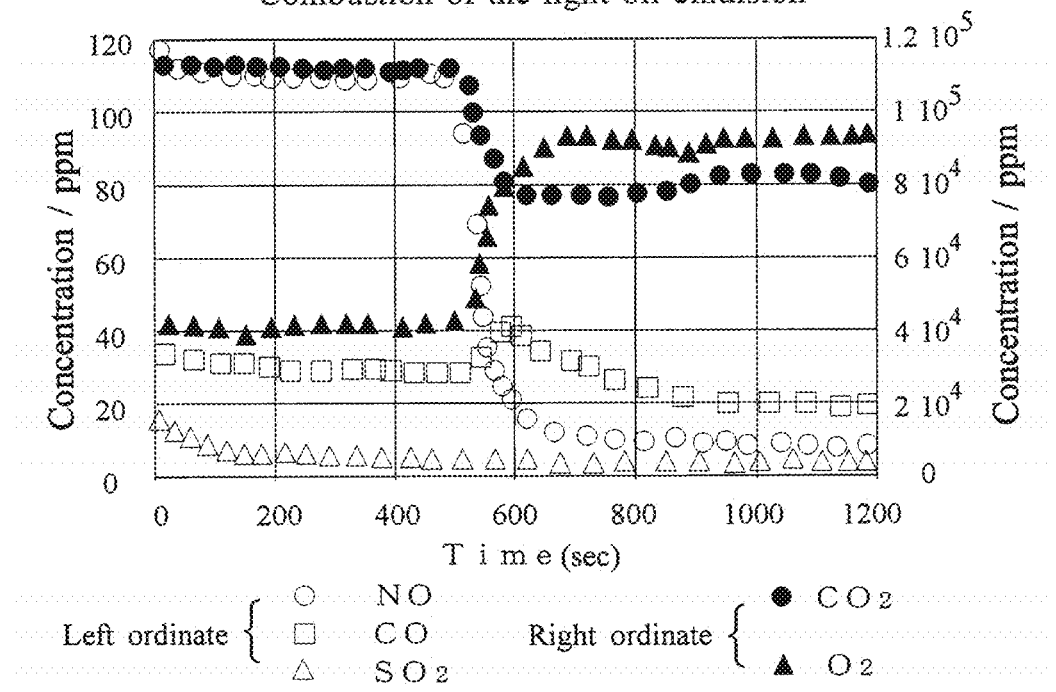
FIG. 14 shows the results of an experiment in which changes in concentration of each exhaust gas component is measured while shifting from the combustion of a light oil to the combustion of a light oil emulsion.
Figure 15:
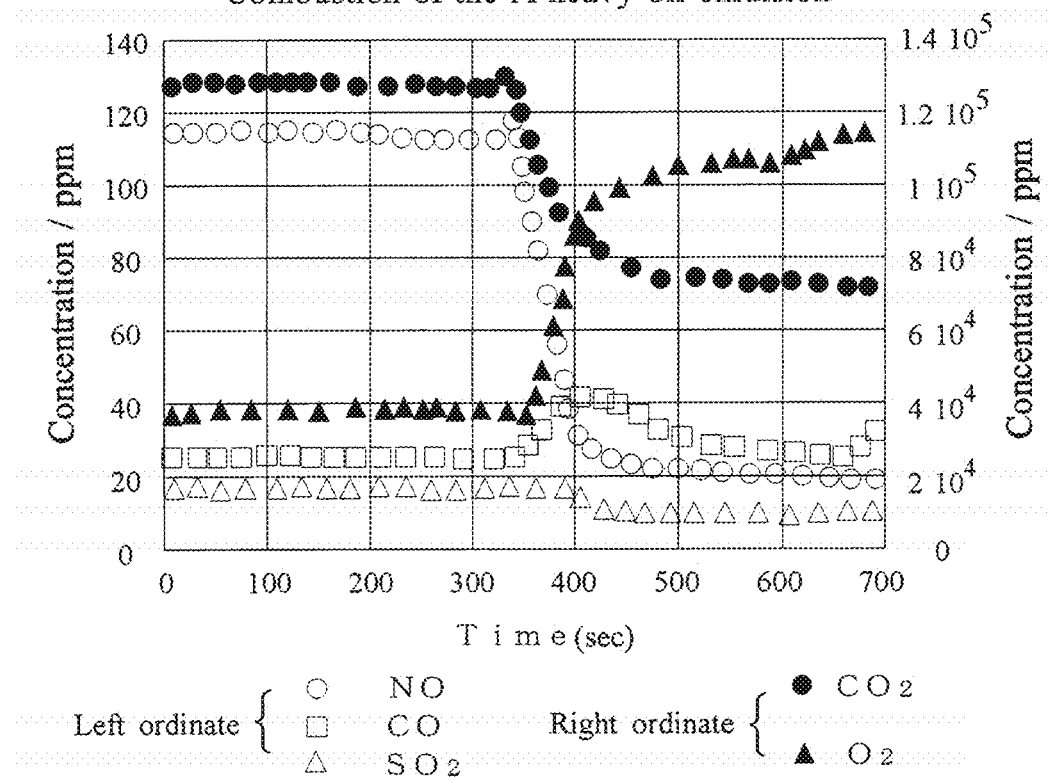
FIG. 15 shows the results of an experiment in which changes in concentration of each exhaust gas component is measured while shifting from the combustion of a heavy oil A to the combustion of a heavy oil A emulsion.

The results of the measurement of exhaust gases from the light oil combustion are shown in FIG. 14, and the results of the measurement of exhaust gases from the heavy oil A combustion are shown in FIG. 15.

As shown by FIG. 14, when the fuel was changed from light oil to emulsion, the NOx concentration in the exhaust gases was significantly reduced, and became approximately ¹/₁₀ of the regular concentration for normal fuel once the combustion was stabilized. Furthermore, although the CO concentration was previously increased, a tendency toward reduction was observed along with the $SO_2$ concentration. On the contrary, the oxygen concentration in the exhaust gases increased, and the $CO_2$ concentration also increased even taking account that considering that the fuel component was 50 wt %. Therefore, the combustion is deemed to be more complete than a fuel solely comprised of light oil. The combustion temperature of the light oil and the emulsion was approx. 1150° C. and 950° C., respectively, a decrease of approximately 200° C.

In addition, as clearly shown by FIG. 15, when the fuel change occurred from heavy oil A to emulsion, the NOx concentration in the exhaust gas was significantly reduced, and became approximately ⅙ of the regular concentration of normal fuel once the combustion was stabilized. Although the CO concentration was previously increased, a tendency toward reduction was observed along with the $SO_2$ concentration. On the contrary, the oxygen concentration in the exhaust gases increased, and the $CO_2$ concentration also increased even taking account that considering that the fuel component was 50 wt %. Therefore, the combustion is deemed to be more complete than a fuel solely comprised of heavy oil A. The combustion temperature of the Heavy oil A and the emulsion was approx. 1050° C. and 900° C., respectively, a decrease of approximately 150° C.

Hence, by using the emulsion fuels described above, it is expected that air pollution can be significantly decreased, and thus reducing the adverse effects on the environment.

INDUSTRIAL APPLICATION

The invention is applicable to functional oil-based agents such as cosmetics, medical products, food products, agrichemicals, fuel emulsions, soil conditioners, etc, or applicable to emulsified preparations in which granule particles have been emulsified and dispersed, and also applicable to uses involving dispersions, etc.

What is claimed is:

1. An emulsification dispersant comprising:
a biopolymer disintegrated into single globular particles, wherein, when the biopolymer is disintegrated into the single globular particles, an average particle size of the single globular particles in the emulsification dispersant is at most 800 nm.

2. The emulsification dispersant according to claim 1, wherein, when the biopolymer is disintegrated into the single globular particles, the average particle size of the single globular particles in the emulsification dispersant is at least 50 nm.

3. The emulsification dispersant according to claim 1, wherein, when the biopolymer is disintegrated into the single globular particles, the average particle size of the single globular particles in the emulsification dispersant is at least 200 nm.

4. The emulsification dispersant according to claim 1, wherein, when the biopolymer is disintegrated into the single globular particles, a concentration of the single globular particles in the emulsification dispersant is at most 20 wt %.

5. The emulsification dispersant according to claim 4, wherein, when the biopolymer is disintegrated into the single globular particles, the concentration of the single globular particles in the emulsification dispersant is at least 0.04 wt %.

6. The emulsification dispersant according to claim 4, wherein, when the biopolymer is disintegrated into the single globular particles, the concentration of the single globular particles in the emulsification dispersant is at least 5 wt %.

7. The emulsification dispersant according to claim 1, wherein the biopolymer is from the group consisting of a polysaccharide, a phospholipid, a polyester, and a chitosan.

8. The emulsification dispersant according to claim 7, wherein the biopolymer is a microbially produced biopolymer.

9. The emulsification dispersant according to claim 7, wherein the polysaccharide is a microbially produced polysaccharide.

10. The emulsification dispersant according to claim 7, wherein the polysaccharide is a naturally-derived polysaccharide.

11. An emulsion formed by mixing an oil component with the emulsification dispersant according to claim 1.

12. The emulsion according to claim 11, wherein, when the emulsion is formed, a weight ratio of the oil component and the emulsification dispersant is 1 to 1000.

13. The emulsion according to claim 11, wherein, when the emulsion is formed, a weight ratio of the oil component and the emulsification dispersant is 50 to 2000.

14. The emulsion according to claim 11, wherein, when the emulsion is formed, an average particle size of the single globular particles in the emulsion is at most 500 nm.

15. The emulsion according to claim 14, wherein, when the emulsion is formed, the average particle size of the single globular particles in the emulsion is at least 5 nm.

16. The emulsion according to claim 14, wherein, when the emulsion is formed, the average particle size of the single globular particles in the emulsion is at least 8 nm.

17. The emulsion according to claim 11, wherein, when the emulsion is formed, water below a designated temperature is added to a mixture of the oil component and the emulsification dispersant.

18. The emulsion according to claim 17, wherein the designated temperature is 60° C.

* * * * *